(12) United States Patent
Vogan et al.

(10) Patent No.: US 8,019,925 B1
(45) Date of Patent: Sep. 13, 2011

(54) METHODS AND STRUCTURE FOR DYNAMICALLY MAPPED MASS STORAGE DEVICE

(75) Inventors: Andrew W. Vogan, Longmont, CO (US); Bruce Liikanen, Berthoud, CO (US)

(73) Assignee: Seagate Technology LLC, Cupertino, CA (US)

( * ) Notice: Subject to any disclaimer, the term of this patent is extended or adjusted under 35 U.S.C. 154(b) by 1371 days.

(21) Appl. No.: 11/122,751

(22) Filed: May 5, 2005

Related U.S. Application Data

(60) Provisional application No. 60/568,777, filed on May 6, 2004.

(51) Int. Cl.
*G06F 12/00* (2006.01)

(52) U.S. Cl. .......................................... 711/4; 711/202

(58) Field of Classification Search .................. None
See application file for complete search history.

(56) References Cited

U.S. PATENT DOCUMENTS

| | | | |
|---|---|---|---|
| 5,440,734 A * | 8/1995 | Wagar | 707/7 |
| 5,459,850 A | 10/1995 | Clay et al. | |
| 5,602,987 A | 2/1997 | Harari et al. | |
| 5,937,435 A * | 8/1999 | Dobbek et al. | 711/202 |
| 5,943,692 A * | 8/1999 | Marberg et al. | 711/203 |
| 6,571,362 B1 * | 5/2003 | Crater et al. | 714/701 |

FOREIGN PATENT DOCUMENTS

WO    WO 93/00635    *    1/1993

* cited by examiner

*Primary Examiner* — Reginald Bragdon
*Assistant Examiner* — Larry MacKall
(74) *Attorney, Agent, or Firm* — David K. Lucente

(57) ABSTRACT

Methods and structures for mapping of logical to physical block addresses within a disk drive to provide independence of the logical block size and the physical disk block size. The independence of the logical and physical block sizes enables numerous beneficial features to improve disk drive capacity, performance and reliability. In one exemplary aspect, indirect mapping table structures and methods map an LBA to an associated IBA representing a block of the same size as the logical block. The IBA is then converted to a corresponding starting quantum unit of data identified by a QA. The QA is, in turn, converted to a disk block identified by a starting DBA and an offset within that DBA. The disk block may be of variable size and is independent of the size of the identified LBA. Numerous other features are enabled by the logical to physical mapping features hereof.

20 Claims, 14 Drawing Sheets

Indirection Hash Table Entry 600
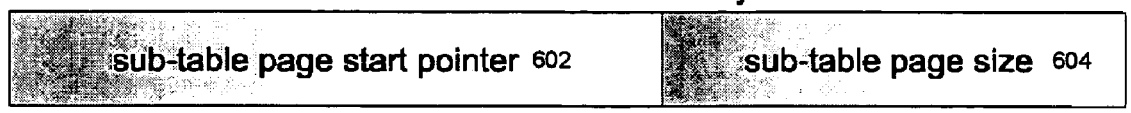
Indirection Sub-table Entry 610
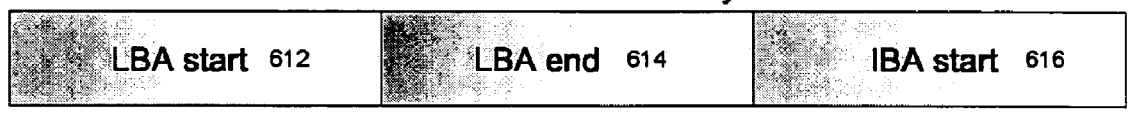
Figure 6

Figure 15

| Pre. 1500 | Syn 1502 | Uncompressed Data 1504 | ECC 1506 |

Figure 16

| Pre. 1500 | Syn 1502 | Comp. 1600 | Compressed Data 1602 | ECC+ 1604 |

Figure 17

| Pre. 1700 | Syn 1702 | Uncompressed Data 1704 | ECC 1706 | Pre. 1710 | Syn 1712 | Uncompressed Data 1715 | ECC 1717 |

Figure 18

| Pre. 1700 | Syn 1702 | Comp. 1800 | Compressed Data 1802 | ECC 1804 |

METHODS AND STRUCTURE FOR DYNAMICALLY MAPPED MASS STORAGE DEVICE

RELATED PATENTS

This patent application is related to and claims priority to U.S. Provisional Patent Application Ser. No. 60/568,777 filed 6 May 2004 and entitled: LBA Indirection in Disk Drives which is hereby incorporated by reference.

BACKGROUND OF THE INVENTION

1. Field of the Invention

The present invention relates generally to mass storage device control structures and methods and more specifically to structures and methods within the controller of a mass storage device, such as a disk drive, operable to map all logical block addresses to corresponding physical block addresses so as to provide independence of the logical block size and physical block size. The same mapping also enables sequential writing of concentric cylinders of the storage device thereby enabling numerous other benefits including use of a physically wider write head.

2. Discussion of Related Art

A common example of a mass storage device is a disk drive having one or more rotating recordable media surfaces each with a corresponding read/write head for writing information thereon and for reading back previously written information. As used herein, "disk drive" is intended to represent such devices with rotating storage media and corresponding read/write heads as well as other similar, exemplary mass storage devices. Further, "recordable media", "recordable media surface", "persistent media" are all intended as synonymous and represent one or more media surfaces on this information may be recorded and read back—typically using optical or magnetic encoding and modulation techniques and structures.

It is generally known in the disk drive arts that fixed sized units of data are physically stored about the circumference of concentric tracks laid out on a magnetic or optical persistent storage medium. These fixed size units of data are often referred to as "blocks" or "sectors". A particular block or sector physically located on the rotating storage medium may be identified by its cylinder or track number and its sector or block number within that track. In addition, where a disk drive includes multiple storage media services each with an independent read write head, a particular head or surface number may identify the surface on which a particular physical block or sector is located. Such physical addresses are often referred to as "CHS" (an acronym for cylinder, head, sector).

Most present-day disk drives permit a logical block address to be utilized by the host system or device rather than a specific CHS designation to identify a particular block or sector to be accessed. Such a logical address is typically a sequential range of logical block numbers from zero through N where N is the maximum number of physical sectors or blocks available on the disk drive storage media. The host may therefore address or identify a particular physical block by its logical block address ("LBA") rather than by the more complex and cumbersome CHS designation. The disk drive (specifically a disk drive controller component of the disk drive) then translates or maps a provided logical block address (LBA) into a corresponding physical location (typically, a CHS address designation). Further, such logical addressing permits the disk drive controller to transparently redirect access for a particular physical block to an alternate or spare physical block where the original physical block has been damaged or is otherwise inaccessible. The disk drive controller merely translates the supplied LBA to a different physical block of the disk storage media.

As presently practiced in the art, physical sectors or blocks on the disk drive are all the same size as measured in number of bytes. For example, present disk drives often utilize a block or sector size of either 512 or 1024 bytes. The particular physical block or sector size may be any suitable size selected for a particular disk drive application in accordance with performance and storage capacity design choice tradeoffs. However, as presently known in the art, physical sectors on a disk drive are all a common, designated size. The logical blocks utilized by a host device in addressing storage of the disk drive are also a fixed size. Though the fixed size of a logical block may be different than the fixed size of the physical disk blocks, as presently practiced a simple arithmetic computation may be used because the physical block size and logical block size are typically integral multiples/fractions of one another. In other words, as presently practiced, a logical block size is typically an integral multiple of the physical block or sector size. Such a strict arithmetic relationship between the logical block size and physical block size precludes a number of possible features and enhancements within a disk drive.

Another issue arising in disk drive technology is the track density (i.e., number of concentric tracks or cylinders per inch or "TPI"). The width of the write head portion of the read/write head assembly is a critical factor in this measure of radial track density. A narrower, more costly write head is capable of accurately writing tracks more closely spaced radially while a wider, less costly write head generates tracks that must be more widely spaced radially and hence reduces track density. Since random write operations are normal in traditional mass storage devices (such as disk drives), the width of the write head must be large enough to permit random writing and rewriting of tracks without interfering with adjacent, previously recorded tracks.

It is evident from the above discussion that a need exists for an improved logical to physical mapping for blocks of data within a disk drive of such that the logical block size defined by an attached host system may be independent of the physical block size used within the disk drive for storage of information. It is also evident from the above discussion that an ongoing need exists for a mass storage device (disk drive) capable of maintaining a high radial track density while minimizing the cost of the write head assembly.

SUMMARY OF THE INVENTION

The present invention solves the above and other problems, thereby advancing the state of the useful arts, by providing methods and structures for indirect mapping of logical block addresses into corresponding physical block addresses in a manner that permits the logical block size and the physical disk block size to be independently defined. In addition, mapping features and aspects hereof enable sequential writing of adjacent tracks to thereby enable higher radial track density. The higher radial track density so enabled further enables use of wider, less expensive write heads to reduce cost of the disk drive.

Numerous additional disk drive features and enhancements are enabled by mapping features and aspects hereof to improve performance, reliability, and capacity of the disk drive. More specifically, in one aspect hereof the physical disk block size may be variable so as to improve utilization of the storage media in the data recording zones located between the servo wedges disposed about the circumference of each track. In particular, exemplary indirect mapping tables and related methods may be provided to map the fixed sized logical blocks identified by logical block addresses from a host system into corresponding locations within the variable sized physical disk blocks of the disk drive.

Other features and aspects hereof improve the capacity of the disk drive by improving the track density (i.e., radial tracks per inch or "TPI"). The logical to physical mapping features hereof permit improved TPI by permitting simpler recovery of data potentially lost due to unavoidable erasure of portions of adjacent tracks during writing of a particular track. In addition, as noted above, the increased radial track density coupled with the sequential writing features and aspects permits use of less expensive, wider write heads.

Still other features and aspects hereof coupled with the logical to physical mapping may improve both capacity and reliability of the disk drive by allowing compression of stored data. Physical space recovered by compressing the physical blocks of data into variable sized physical disk blocks may be used either for increased storage capacity and/or for additional error correction information. Such compressed data utilizes less physical space than its uncompressed counterpart thereby increasing physical capacity of the disk drive. Further, compressed data provides an improved effective error rate using the same error correcting codes ("ECC") when read from the physical disk media as compared to its uncompressed counterpart. Still further, additional error correction codes may be provided in the recovered physical space to further enhance reliability.

One feature hereof provides a disk drive comprising: a plurality of physical disk blocks distributed over one or more recordable media and wherein each physical disk block is identified by a corresponding physical disk block address; and a disk controller communicatively coupled to the plurality of physical disk blocks and adapted to control access to the plurality of physical disk blocks by an attached host device, the disk controller further comprising: mapping tables adapted to map requests by an attached host device for access to a logical block identified by a logical block address into access to one or more corresponding physical disk blocks identified by physical disk block addresses, wherein the size of the logical block is independent of the size of the one or more corresponding physical disk blocks.

Another aspect hereof further provides that the mapping tables further comprise: an indirection table of indirect block addresses wherein each entry in the indirection table identifies a starting location in the plurality of physical disk blocks corresponding to a logical block address.

Another aspect hereof further provides that the indirection table further comprises a vector of entries sorted by the logical block address to which each entry corresponds, and provides that the mapping tables further comprise a hash table hashed using a first portion of a logical block address and wherein each entry in the hash table identifies a corresponding starting logical block address for a block of entries in the indirection table.

Another aspect hereof further provides that each physical disk block is comprised of a plurality of quantum data units each identified by a corresponding quantum address, and that each indirection table entry identifies the starting location by a corresponding quantum address, and that the mapping tables further comprise a second indirection table having a plurality of entries each identified by a corresponding quantum address and wherein each entry of the second indirection table identifies a corresponding physical disk block address that contains the corresponding quantum data unit and identifies an offset within the corresponding physical disk block address at which the corresponding quantum data unit starts.

Another feature hereof provides a disk drive comprising: a plurality of physical disk blocks distributed over a rotating recordable medium and wherein each physical disk block is identified by a corresponding physical disk block address; a write head controllably positionable over each of a plurality of concentric radial track positions on the recordable medium and having a write head width for recording information on a track position using a first width; and a disk controller communicatively coupled to the write head wherein the disk controller is adapted to write adjacent radial track positions on the recordable medium sequentially such that a subsequent write partially overlaps a preceding write of an adjacent track such that the resulting track pitch of the information written on the adjacent track is smaller than the first width, the disk controller further comprising: mapping tables adapted to map requests by an attached host device for access to a logical block identified by a logical block address into access to one or more corresponding physical disk blocks identified by physical disk block addresses, wherein the size of the logical block is independent of the size of the one or more corresponding physical disk blocks.

Another aspect hereof further provides that the mapping tables further comprise: an indirection table of indirect block addresses wherein each entry in the indirection table identifies a starting location in the plurality of physical disk blocks corresponding to a logical block address.

Another aspect hereof further provides that the indirection table further comprises a vector of entries sorted by the logical block address to which each entry corresponds, and that the mapping tables further comprise a hash table hashed using a first portion of a logical block address and wherein each entry in the hash table identifies a corresponding starting logical block address for a block of entries in the indirection table.

Another aspect hereof further provides that each physical disk block is comprised of a plurality of quantum data units each identified by a corresponding quantum address, and that each indirection table entry identifies the starting location by a corresponding quantum address, and that the mapping tables further comprise a second indirection table having a plurality of entries each identified by a corresponding quantum address and wherein each entry of the second indirection table identifies a corresponding physical disk block address that contains the corresponding quantum data unit and identifies an offset within the corresponding physical disk block address at which the corresponding quantum data unit starts.

Another feature provides a method operable in a disk controller of a disk drive for accessing a physical disk block address ("DBA") in the disk drive, the method comprising: receiving a request from a host to access a logical block identified by a logical block address ("LBA") within the disk drive where the logical block has a host defined size; applying the LBA to a mapping table structure to indirectly determine a corresponding DBA; and using the DBA to access persistent media on the disk drive, wherein the size of the disk block identified by the DBA is not the same as the size of the logical block identified by the LBA and wherein the size of the disk block identified by the DBA is independent of the size of the logical block identified by the LBA.

Another aspect hereof further provides that the step of applying further comprises: applying the LBA to a mapping table to determine an indirect block address ("IBA") corresponding to a block having a block size equal the block size of the LBA; and determining the starting DBA from the IBA.

Another aspect hereof further provides that the DBA comprises a plurality of small quantum data units and wherein the IBA may start at any integral boundary of a small quantum data unit within the starting DBA.

Another aspect hereof further provides that the step of determining further comprises: mathematically determining a quantum address ("QA") from the IBA; and determining the starting DBA from the QA.

Another aspect hereof further provides that the step of determining the starting DBA from the QA further comprises: applying the QA to a second mapping table to determine the starting DBA and an offset within the starting DBA.

Another aspect hereof further provides that the step of applying further comprises: hashing a first portion of the LBA to obtain a pointer to a block of pointers relating LBAs to corresponding IBAs; and locating in the block of pointers the IBA corresponding to the LBA using a second portion of the LBA.

Another aspect hereof further provides that the step of locating further comprises: searching the block of pointers for a select pointer corresponding to the LBA.

Another aspect hereof further provides for writing the mapping table structure to a reserved portion of the persistent media of the disk drive.

Another aspect hereof further provides that the step of writing further comprises: writing the mapping table structure to multiple reserved portions of the persistent media of the disk drive.

Another aspect hereof further provides for updating the mapping table structure in response to access the disk drive to write blocks to the disk drive at the LBA; and periodically re-writing the updated mapping table structure to the reserved portion.

Another feature hereof provides a method operable in a disk controller of a disk drive for writing adjacent tracks in a disk drive, the method comprising: mapping a supplied starting logical block address ("LBA") to a corresponding physical disk block address ("DBA"); sequentially writing a plurality of physical disk blocks starting at the corresponding DBA wherein the plurality of physical disk blocks span multiple adjacent radial track locations within the disk drive where the step of writing includes: writing each adjacent track with a write head having a first width and so as to partially overlap an earlier written track to thereby reduce the width of the earlier written track to a second width than the first width.

Another aspect hereof further provides that the step of mapping further comprises: applying the LBA to a mapping table structure to indirectly determine the corresponding DBA.

Another aspect hereof further provides that a logical block has a block size associated therewith and wherein the step of applying further comprises: applying the LBA to a mapping table to determine an indirect block address ("IBA") corresponding to a block having a block size equal the block size of the LBA; and determining the starting DBA from the IBA.

Another aspect hereof further provides that the DBA comprises a plurality of small quantum data units and wherein the IBA may start at any integral boundary of a small quantum data unit within the starting DBA.

Another aspect hereof further provides that the step of determining further comprises: mathematically determining a quantum address ("QA") from the IBA; and determining the starting DBA from the QA.

Another aspect hereof further provides that the step of determining the starting DBA from the QA further comprises: applying the QA to a second mapping table to determine the starting DBA and an offset within the starting DBA.

Another aspect hereof further provides that the step of applying further comprises: hashing a first portion of the LBA to obtain a pointer to a block of pointers relating LBAs to corresponding IBAs; and locating in the block of pointers the IBA corresponding to the LBA using a second portion of the LBA.

Another aspect hereof further provides that the step of locating further comprises: searching the block of pointers for a select pointer corresponding to the LBA.

Another feature hereof provides a method operable in a disk drive for storing information on the disk drive, the method comprising: pre-allocating a write band comprising an area of contiguous disk blocks on the persistent media of the disk drive wherein the write band is identified by a starting DBA; receiving a request to write user data to the disk drive wherein the request identifies a start LBA for the data to be written wherein the size of a logical block represented by the start LBA is different than the size of a disk block of the write band and wherein the size of a logical block represented by the start LBA is independent of the size of a disk block represented by the starting DBA; writing the user data to the pre-allocated write band; and updating a mapping table structure to associate the start LBA with the starting DBA.

Another aspect hereof further provides for advancing the starting DBA of the write band past the end of the user data written by the step of writing to allocate a new write band.

Another aspect hereof further provides for applying the start LBA of the request to a mapping table structure to determine whether any current DBA is associated with the start LBA; freeing a disk block starting at the current DBA from association with the start LBA; and updating the mapping table structure to dis-associate the start LBA with the current DBA.

Another aspect hereof further provides for defragmenting the disk blocks by moving previously written disk blocks that sequentially follow the write band to disk blocks that sequentially precede the write band.

Another aspect hereof further provides that the mapping table structure includes a table of entries associating an LBA with an indirect pointer to one or more associated small quantum data units that comprise one or more DBAs associated with the LBA and wherein the indirect pointer may point to any integral boundary of the one or more small quantum data units.

Another feature hereof provides a disk drive having a persistent storage media and having a disk controller for reading and writing data on the persistent storage media, the disk controller comprising: processing means for receiving and processing read and write requests from a host device; and mapping means, associated with the processing means, for mapping all logical block addresses supplied in the requests into corresponding disk block addresses corresponding to physical locations on the persistent storage media wherein the size of logical blocks identified by the logical block addresses is independent of the size of disk blocks identified by the corresponding disk block addresses.

Another aspect hereof further provides that the mapping means further comprises: mapping table means for translating an LBA supplied in a request into a corresponding starting DBA.

Another aspect hereof further provides that the mapping table means further comprises: IBA mapping table means for translating the LBA into a corresponding starting indirect block address ("IBA") wherein the size of a block identified by the starting IBA is the same as the size of a logical block identified by the LBA; and DBA translation means for translating the starting IBA into a corresponding starting DBA and offset with the starting DBA.

Another aspect hereof further provides for means for periodically storing the mapping table means on the persistent storage.

Another aspect hereof further provides for means, operable in initializing the disk drive, for reading the mapping table means from the persistent media; and means for updating the mapping table means read from the persistent media to reflect changes in the data stored on the persistent media after the storage of the mapping table means thereon.

Another aspect hereof further provides for means for restoring the content of the persistent media to an earlier state reflected by a previously stored version of the mapping table means.

Another aspect hereof further provides for means for compressing data written to the persistent storage media; and means for decompressing data read from the persistent storage media.

Another feature hereof provides a disk drive having a persistent storage media, having a write head having a first track width associated therewith, and having a disk controller for reading and writing data on the persistent storage media, the disk controller comprising: mapping means for mapping a logical block address ("LBA") into a corresponding disk block address ("DBA") corresponding to physical locations on the persistent storage media; and writing means for sequentially writing a plurality of physical disk blocks at a starting DBA wherein the plurality of physical disk blocks span multiple adjacent radial track locations on the persistent storage media and where the writing means includes: means for writing each track using the write head such that a written track has a track width substantially equal to the first width and so as to partially overlap an earlier written track to thereby reduce the width of the earlier written track to a second width than the first width.

Another aspect hereof further provides that the mapping means further comprises: mapping table means for translating an LBA supplied in a request into a corresponding starting DBA.

Another aspect hereof further provides that the mapping table means further comprises: IBA mapping table means for translating the LBA into a corresponding starting indirect block address ("IBA") wherein the size of a block identified by the starting IBA is the same as the size of a logical block identified by the LBA; and DBA translation means for translating the starting IBA into a corresponding starting DBA and offset with the starting DBA.

Another aspect hereof further provides for means for periodically storing the mapping table means on the persistent storage.

Another aspect hereof further provides for means, operable in initializing the disk drive, for reading the mapping table means from the persistent media; and means for updating the mapping table means read from the persistent media to reflect changes in the data stored on the persistent media after the storage of the mapping table means thereon.

Another aspect hereof further provides for means for restoring the content of the persistent media to an earlier state reflected by a previously stored version of the mapping table means.

Another aspect hereof further provides for means for compressing data written to the persistent storage media; and means for decompressing data read from the persistent storage media.

BRIEF DESCRIPTION OF THE DRAWINGS

FIG. 6 is a block diagram providing additional details of exemplary entries in the mapping tables of FIG. 5.

FIGS. 15 through 18 are block diagrams suggesting the potential benefits derived from data compression within a disk drive as in FIG. 14.

DETAILED DESCRIPTION OF THE DRAWINGS

Logical to Physical Indirect Mapping

Figure 1:
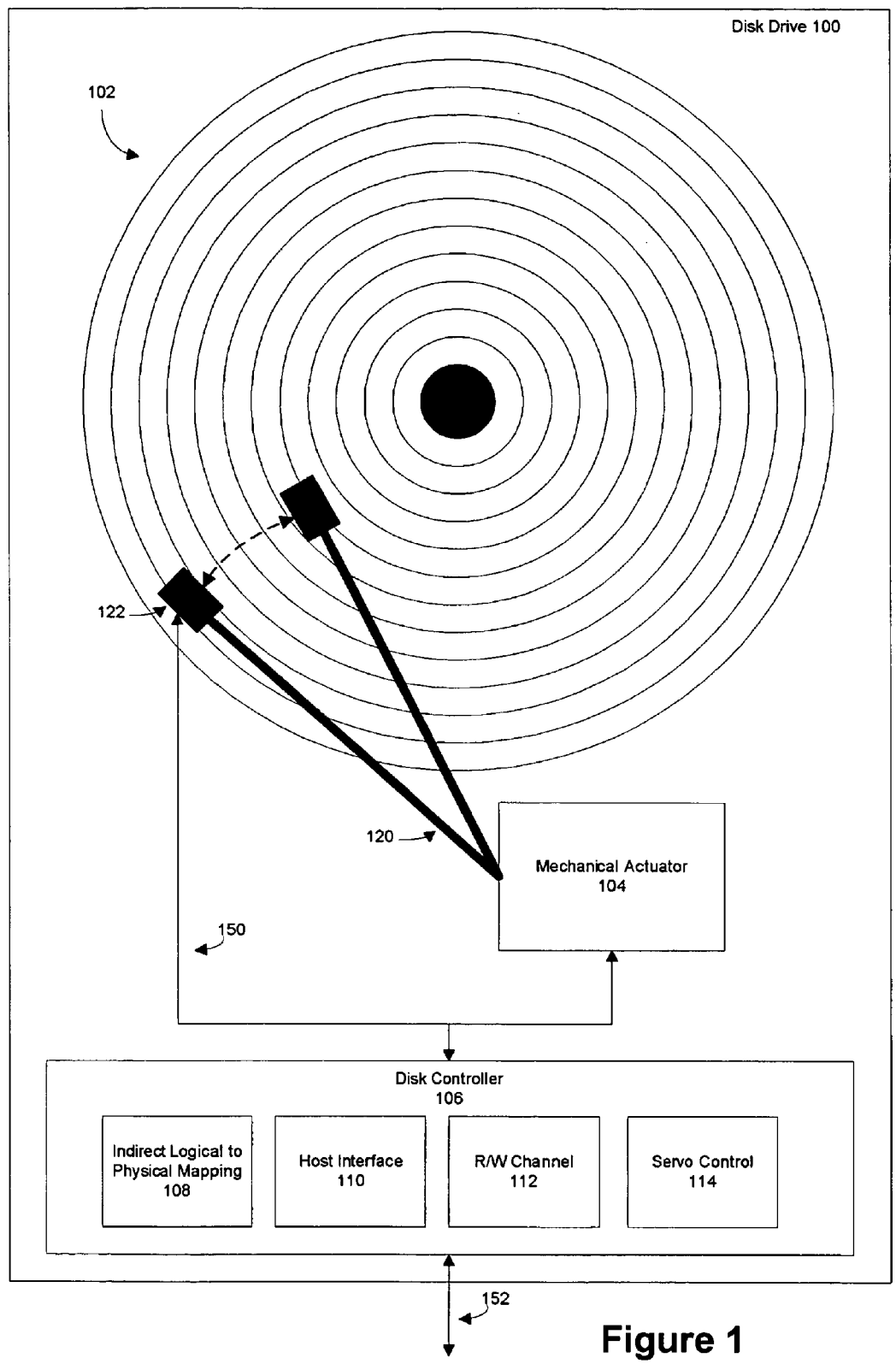
FIG. 1 is a block diagram of an exemplary disk drive enhanced in accordance with features and aspects hereof to provide indirect logical to physical mapping and to thereby enable numerous related enhancements for capacity, performance, and reliability.

FIG. 1 is a block diagram describing a disk drive 100 embodying features and aspects hereof for indirect mapping of logical block addresses to corresponding physical disk block addresses. Disk drive 100 includes rotating storage media 102 for recording information using optical or magnetic modulation techniques. Read/write head 122 is positioned over a surface of rotating disk storage media 102 to record (write) information on the surface of medium 102 and to sense (read) previously recorded information therefrom. Read/write head 122 is moved radially between concentric tracks arranged on disk storage medium 102 by pivoting arm 120 and mechanical actuator 104. Positioning of the read/write head 122 over a particular desired concentric track is controlled by disk controller 106. Disk controller 106 communicates with mechanical actuator 104 and read write head 122 via path 150. Disk controller 106 may include host interface element 110 for communicating with attached host devices, read/write channel element 112 for encoding and decoding information written or read by read/write head 122, and servo control 114 for accurately controlling rotational speed of disk storage medium 102 and the radial track positioning of read/write head 122. A plurality of disk platters (i.e., multiple storage media 102) and corresponding read/write heads 122 may be incorporated within a single disk drive such that vertically aligned concentric tracks may be accessed simultaneously by multiple read/write heads. Such a plurality of aligned tracks are typically referred to as a cylinder. Sectors or physical disk blocks are then recorded about the circumference of each track of a disk media surface.

As is generally known in the disk drive arts as presently practiced, a particular physical disk block or sector has a fixed size and is a located by its radial track or cylinder position, a head number (where multiple heads and surfaces are incorporated), and a sector or block number on that track or cylinder. Further, as presently practiced in the art, host systems address the physical disk blocks of a disk drive using a logical block address ranging between 0 and N where N is the number of available physical disk blocks provided within the disk drive. As presently known in the art, logical blocks, like physical blocks, are fixed size. Typically, the logical block size is an integral multiple of the size of the physical disk block. Disk drive controllers as presently practiced in the art therefore perform a simple mathematical mapping or translation between a supplied logical block address and a corresponding physical disk block address. A logical block address is simply converted mathematically into a corresponding physical track or cylinder, a physical head and a physical sector or block on that head and cylinder.

As presently practiced in the art, a disk drive controller may perform additional mapping between logical and physical disk block addresses by supplying a table for bad blocks in which the data is unreadable due to physical damage or otherwise. The bad block table may translate a given original address (either logical block address or physical disk block address) into an alternate or spare address for redirecting host access from an original bad block to a replacement, alternate or spare usable block.

As noted above, such fixed mapping between logical block addresses and corresponding physical disk block addresses limits the flexibility to provide a number of useful features. A key to such problems generally derives from the requisite mathematical relationship between physical disk block size and logical disk block size.

In accordance with features and aspects hereof, indirect logical to physical mapping element 108 in disk controller 106 provides structure and methods for mapping logical block addresses utilized by host devices into corresponding physical disk block addresses for blocks stored on the disk storage medium 102. The indirect mapping structures and methods provide independence of the logical block size and physical block size to thus enable implementation of numerous enhancements and benefits as discussed further herein below.

Those of ordinary skill in the art will recognize that FIG. 1 is merely intended as exemplary of typical components, structures, and functions within a disk drive 100 enhanced in accordance with features and aspects hereof Numerous equivalent structures and functional elements may be provided as a matter of design choice to achieve the desired functionality of indirect logical to physical disk block address mapping. Further, those of ordinary skill in the art will recognize a wide variety of additional elements useful in design and operation of any disk drive 100. Still further, any number of disk storage media surfaces and corresponding read/write heads may be provided within a disk drive 100 enhanced in accordance with features and aspects hereof.

Figure 2:
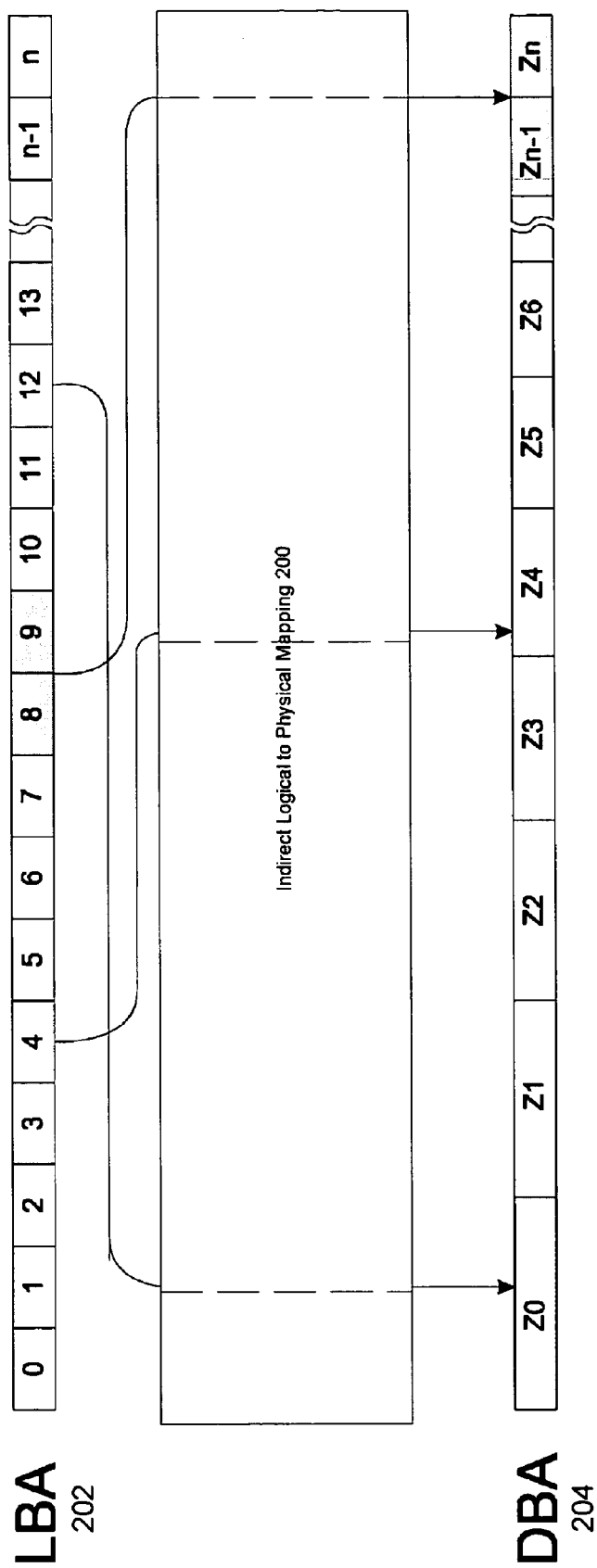
FIG. 2 is a block diagram depicting an exemplary logical to physical mapping element in accordance with features and aspects hereof to map sample logical block addresses into corresponding physical disk block addresses.

FIG. 2 is a block diagram suggesting operation of an indirect logical to physical mapping element 200 (similar to element 108 of FIG. 1). The logical block space 202 comprises a plurality of identically sized logical blocks enumerated by a logical block address ("LBA") ranging from 0 through N. The logical block size may be defined by a host operating system or file system and may represent any convenient size for the particular storage application. In other words, larger logical block sizes may be preferred for certain applications such as multimedia streaming or video data recording while smaller block sizes may be preferred for random access general file storage or database applications. LBA space 202 therefore represents an exemplary sequence of logical block addresses each representing a corresponding logical block of equal, pre-determined size.

Disk block space 204 represents physical disk blocks stored and retrieved from the disk storage medium of the disk drive. Within a disk drive controller, the physical disk block space 204 may also be addressed by a sequential index representation of a plurality of blocks indexed by a sequence identifier (e.g., Z0 through Zn where Zn is the total number of physical disk blocks available within the storage medium of the disk drive). The sequential index Z0 through Zn may also be translated by mathematical and/or other mapping means into corresponding CHS forms of addressing for lower level read and write operations.

In accordance with the indirect logical to physical mapping features hereof, mapping element 200 is capable of mapping the fixed size logical blocks from the logical block space 202 into corresponding portions of the physical disk block space 204. The physical disk blocks in the physical space 204 may be of any size independent of the size of the logical blocks in the logical space 202. The physical disk blocks may be of equal, fixed sizes or may be variable in size but, in any case, the physical disk block size is independent of the size of the logical blocks.

In one aspect hereof as shown in FIG. 2, the physical disk blocks Z0 through Zn may be variable in size and thereby adapted to optimize available physical space between servo zones disposed on the disk storage medium surface. As is generally known in the art, special sequences of information referred to as servo information may be recorded at various intervals in the circumferential direction of each track. Often the area between sequential servo zones may be referred to as a servo wedge in view of its wedge shape or pie shape geometry between radially disposed servo zones over the entire radial surface of the disk platter. Each physical disk block may therefore be configured as any appropriate size to optimize utilization of this variable sized space within each servo wedge. Hence, Z0 may be larger than Zn because it may be located within a wider servo wedge area of the disk media surface.

Figure 3:
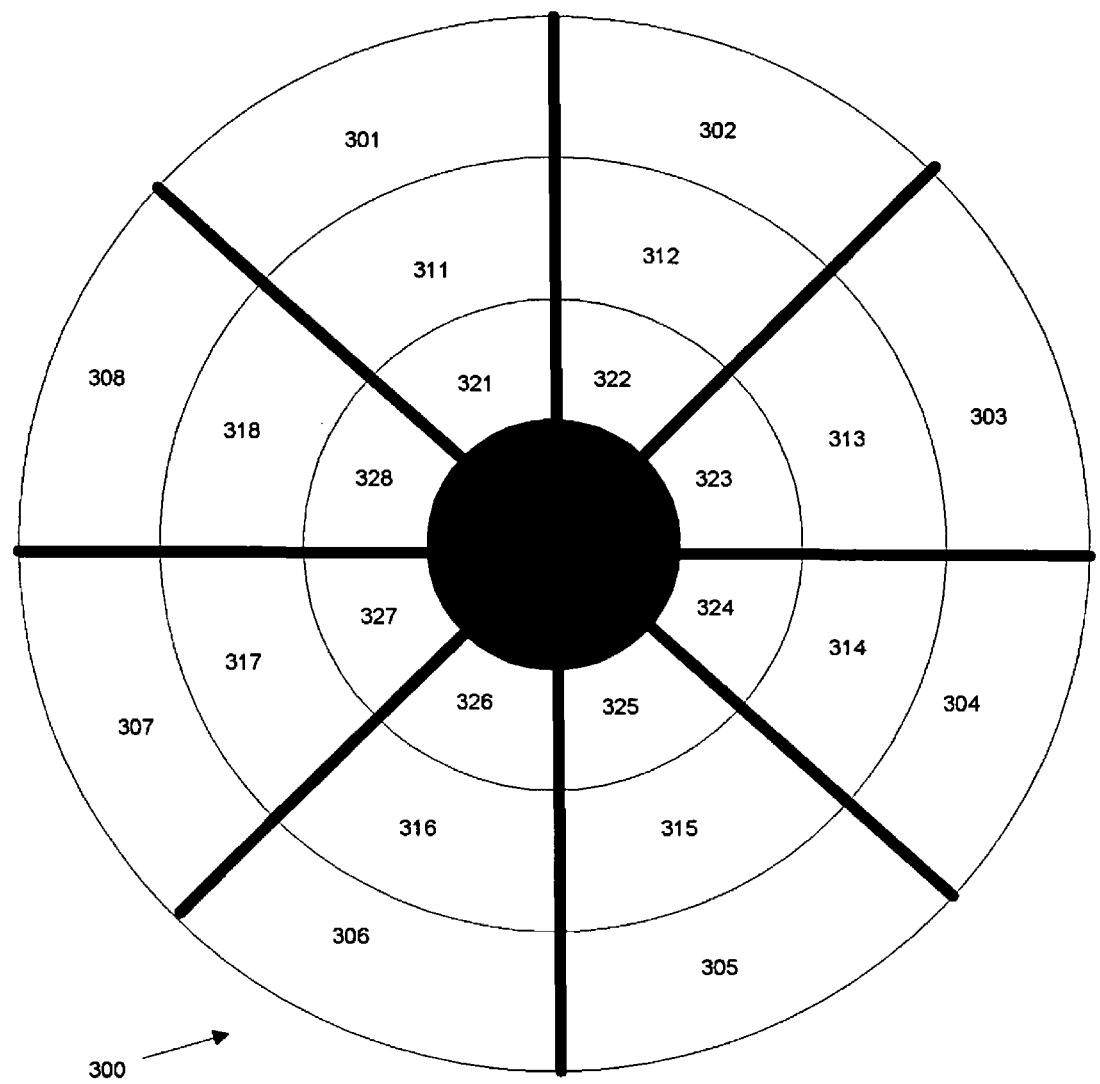
FIG. 3 is a schematic diagram suggestive of the variable physical disk block sizes that may be disposed at different radial track positions of a disk media surface in accordance with features and aspects hereof.

Since the physical disk block size is independent of the logical block size utilized by the time it attached host devices, features and aspects hereof allow the physical data block size to vary in accordance with the location of the block on the physical disk storage medium. For example, as shown in FIG. 3, physical disk blocks at an outer diameter circumference outer diameter track of the disk drive may be larger than those at an inner diameter track of the disk drive. For example, blocks 301 through 308 may be larger than blocks 311 through 318 positioned at a more inward radial position. In like manner, blocks 311 through 318 may be larger than physical blocks 321 through 328 at a still further inward radial position.

Returning again to FIG. 2, indirect logical to physical mapping element 200 may therefore map the pre-determined, fixed sized, logical blocks referenced by a host device into any portion of any of the fixed or variable sized physical disk blocks. A logical block boundary (start or end) need not coincide with a physical disk block boundary. As discussed further herein below, meta-data stored within (or otherwise associated with) the physical disk blocks may be used to determine the size of each physical block and hence the location of the next physical disk block.

For example, as shown in FIG. 2, logical blocks 3, 4 and 5 in LBA space 202 are translated by mapping element 202 to a starting portion of physical disk block Z3 and the entirety of disk block Z4 in DBA space 204. Logical blocks 8 and 9 are similarly mapped to a starting portion of DBA Zn−1 and the entirety of DBA Zn. Further, logical blocks 11, 12 and 13 are mapped to the entirety of physical disk block Z0 and a beginning portion of physical disk block Z1.

Those of ordinary skill in the art will readily recognize that any number of logical blocks may be provided in a particular application and any number of disk blocks may be defined within a particular disk drive as appropriate for a particular application. Further, as is evident from FIG. 2, the logical block size and the physical disk block size may be independent of one another so as to enable numerous additional features and aspects hereof discussed further herein below. Still further, the plurality of physical disk blocks may vary in size as desired for a particular application to further optimize utilization of the area between servo zones (i.e., to fully utilize the physical space available in each servo wedge).

Indirect logical to physical mapping element 200 of FIG. 2 therefore represents any processing means and/or structures and methods that permit such flexible mapping of logical block addresses to physical disk block addresses through indirection while permitting independence of the size of logical blocks and physical disk blocks. Details of exemplary methods and structures are presented herein below. Those of ordinary skill in the art will recognize numerous equivalent methods and structures for providing such flexible mapping in accordance with features and aspects hereof.

Figure 4:
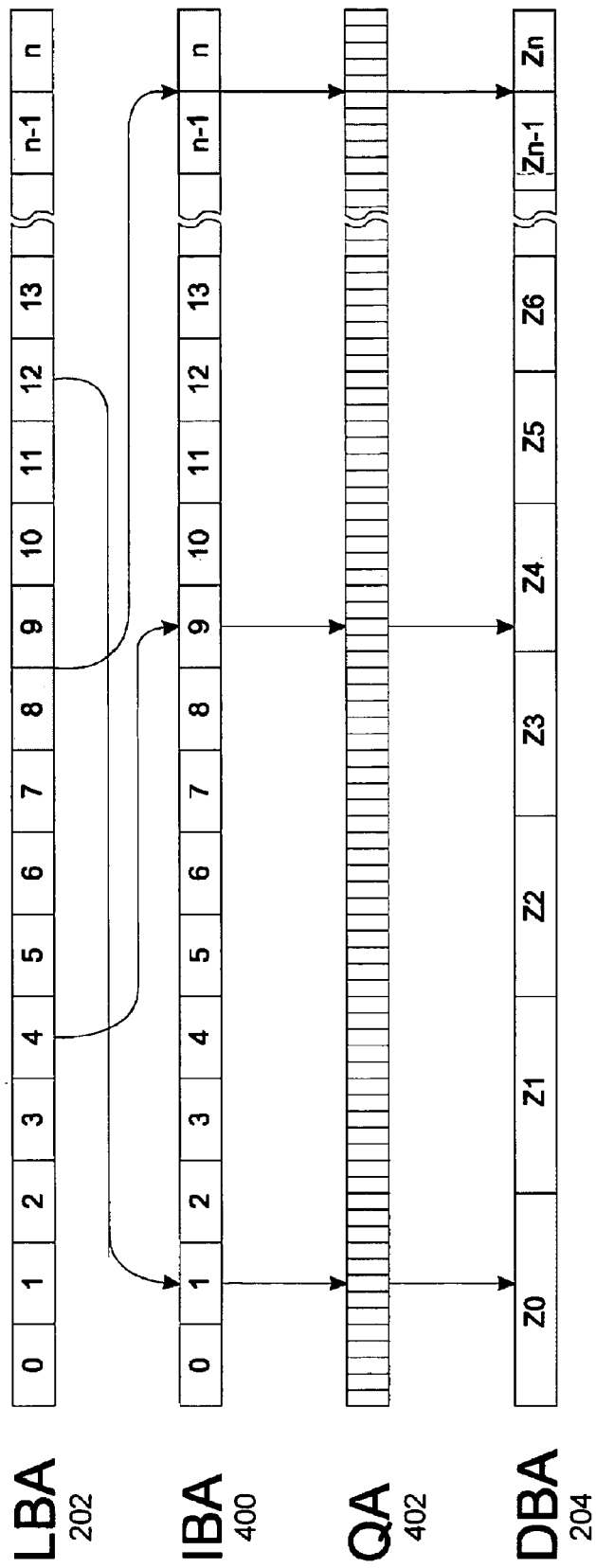
FIG. 4 is a diagram describing an exemplary mapping of logical block addresses to corresponding physical disk block addresses in accordance with exemplary data structures embodying features and aspects hereof.

FIG. 4 shows one exemplary structure and technique for achieving the desired indirect mapping between LBA space 202 and DBA space 204. A logical block address may be used to determine a corresponding intermediate block address in IBA space 400. The IBA space 400 and the LBA space 202 may utilize the same host defined block size—i.e., the logical block size. This first level of indirect mapping from LBA space 202 to IBA space 400 permits the LBA space 202 to be initially distributed and later redistributed on the disk drive media surface at virtually any time in a manner transparent to the host device. All blocks defined in LBA space 202 may be relocated at any time by operation of methods and structures in accordance with features and aspects hereof—i.e., any block, not merely a small number of "bad blocks" recorded in a small table as previously practiced in the art.

A next level of mapping maps between the IBA space 400 and a quantum data unit space 402 ("QA space"). All physical storage space available within a disk drive may be broken down into a sequence of smaller quantum units of data. The size of a quantum unit of data may be any convenient size in accordance with design choices well known to those of ordinary skill in the art but should be substantially smaller than the logical block size utilized by a host device. For example, the quantum unit data size may be equal to the size of a computer processor "word" used within the disk drive controller—i.e., four bytes in a typical 32 bit processing environment or eight bytes in a typical 64 bit processing environment. Preferably, the quantum unit data size will match a convenient word size related to processor and/or DMA movement of data among various components within the disk controller. Hence, 32 bits or 64 bits may be convenient sizes for typical disk controller applications.

Although the logical block size and disk block size are independent of one another, both the disk block size and the logical block size should be integral multiples of the quantum unit data size. In other words, where the quantum unit data size is, for example, a "quadlet" (32 bits), the logical block size and physical disk block size should both be integral multiples of the fundamental quadlet quantum unit data size (i.e., integral number of quadlet words).

The IBA space 400 corresponds to associated contiguous sequences of quantum data units. Pointers or other data structure indicia discussed further herein below may be used to translate between an indirect block address and a quantum unit of data address. For example, as depicted in FIG. 4, IBA blocks 0 through 2 correspond with the first fifteen quantum units of data graphically aligned in FIG. 4 immediately below IBA blocks 0, 1 and 2. In like manner IBA blocks 8 through 10 correspond to the quantum unit of data contiguous elements graphically aligned immediately below IBA blocks 8, 9 and 10 in FIG. 4. Similarly IBA blocks n−1 and n correspond to the quantum data units graphically aligned immediately below IBA blocks n−1 and n. The translation between an IBA space 400 block number and corresponding quantum data units may be a simple mathematical determination.

Lastly, the logical to physical mapping features and aspects hereof may translate the QA space 402 into corresponding positions within DBA space 204. Where, as shown in FIG. 4, the disk block sizes are variable, mapping between the QA space 402 and the DBA space 204 may be by mathematical means in combination with a table identifying the size of physical disk blocks in each cylinder, servo wedge or zone. Where the DBA space 204 comprises equal sized physical disk blocks, the translation between the QA space 402 and the DBA space 204 may be by simple mathematical means.

These multiple levels of mapping provide one exemplary embodiment of features and aspects hereof. Mapping from the LBA space 202 into the IBA space 400 allows physical blocks to be relocated at the sole discretion of the disk drive controller transparently with respect to any attached host system. Next, the mapping between fixed block sizes as such as in the LBA space 202 (and the corresponding blocks in the IBA space 400) and DBA space 204 is accomplished by means of the quantum space 402 translation. Since both logical block sizes and physical disk but sizes should be integral multiples of the quantum unit data size, logical blocks may be translated into corresponding disk block addresses independent of the respective sizes.

Figure 10:
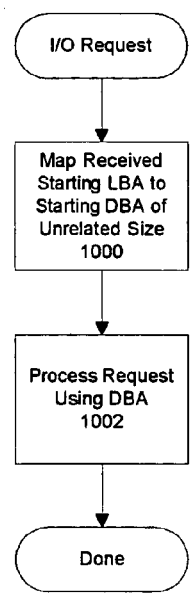
FIG. 10 is a flowchart describing exemplary high level processing of an I/O request received from an attached host device involving logical to physical mapping in accordance with features and aspects hereof.
Figure 11:
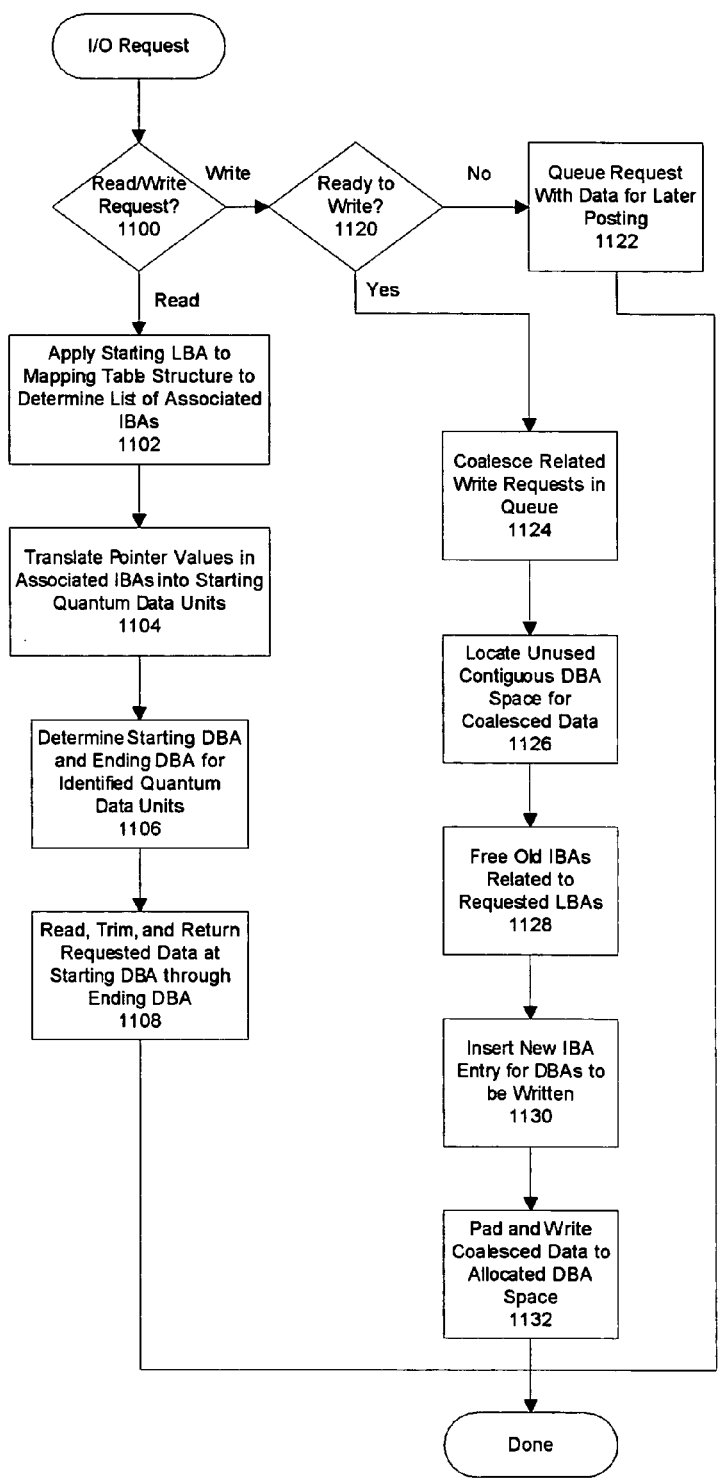
FIG. 11 is a flowchart providing additional exemplary details of I/O request processing involving logical to physical block address mapping in accordance with features and aspects hereof.

FIGS. 10-11 are flowcharts describing methods useful in conjunction with the exemplary structures discussed above to provide logical to physical mapping in processing of host I/O requests. FIG. 10 is a flowchart describing a high level view of operation of a disk drive in accordance with features and aspects hereof to process an I/O request using a logical block address provided by an attached host device. Element 1000 is first operable to map the received starting LBA into a corresponding starting physical DBA where the size of the logical block and physical disk block are substantially independent. Element 1002 is then operable to complete processing of the received I/O request using the disk block address determined by the mapping process of element 1000.

FIG. 11 is a flowchart describing I/O processing of FIG. 10 in additional exemplary detail. Element 1100 is first operable to determine whether a received I/O request is a read or write request. If the received I/O request is a read request, element 1102 is operable to apply the starting LBA received in the request to a mapping table structure (e.g., such as shown in FIG. 4) to determine a corresponding list of associated indirect block addresses. Element 1104 is then operable to translate information in the identified associated list of IBAs into corresponding starting addresses of quantum units of data (e.g., a list of starting and ending addresses in QA space). Element 1106 is then operable to determine the starting and ending DBAs for the identified contiguous quantum units of data. Element 1108 is then operable to perform lower level disk operations to read the requested contiguous portions of physical disk blocks. Since the desired contiguous quantum units of data may not correspond to starting or ending boundaries of disk blocks, the retrieved data may include portions of disk blocks that precede the desired quantum units of data and/or that follow the desired quantum units of data. Extraneous data may be removed by operation of element 1108 and the trimmed data (requested data with extraneous start/end data removed) may then be returned to the requesting host device.

If element 1100 determines that the received request is a write request, element 1120 determines whether the disk drive is presently ready to write the requested data. As is generally known in the art, data for a write request may simply be queued for later posting with the requested write data stored in the cache memory or otherwise managed within the disk drive controller. If the write operation is to be deferred for a later posting, element 1122 is next operable to queue the request for later posting and thereby complete this disk write request. Such techniques are often referred to as write-back caching in that the request is completed as soon as the disk drive controller has the request stored in its local cache memory.

If element 1120 determines that the disk drive may presently proceed with the requested disk write operation, element 1124 is first operable to coalesce this request's write data with the data of other previously queued write requests. Since physical disk blocks may be variable in size, groups of contiguous related data stored in the disk drive controllers write cache memory may be coalesced into a single larger data frame structure as discussed further herein below. The data frame may coalesce contiguous related data and may span portions of one or more physical disk blocks. Element 1126 is then operable to locate an appropriate unused contiguous portion of the physical disk storage medium identified by a starting disk block address. The unused contiguous disk space is preferably larger enough to contain the coalesced data to be written.

The data to be written may include portions of contiguous data previously written to the disk drive and now coalesced with new data. This new data frame may be written to a new physical location of the disk drive storage medium and therefore any existing mapping structures for indirect block addresses associated with the coalesced data to be written are freed by operation of element 1128. Element 1130 is then operable to insert a new LBA/IBA mapping entry in the master addressing table corresponding to the new disk block (s) about to be written. Element 1132 is then operable to add any required padding to the data frame to be written and so that the lower level disk operations may write one or more full disk blocks to the disk storage medium. Element 1132 then completes the write operation by writing the coalesced, padded, physical blocks formatted as a data frame onto the persistent disk storage medium.

Exemplary Mapping Structures and Methods

The logical to physical mapping described above with respect to FIGS. 10 and 11 may be performed in accordance with numerous mapping structures and techniques that permit indirection of the mapping to enable relocation of physical disk blocks independent of the host supplied logical block addresses and that permit independence of the logical block size and physical block size.

Figure 5:
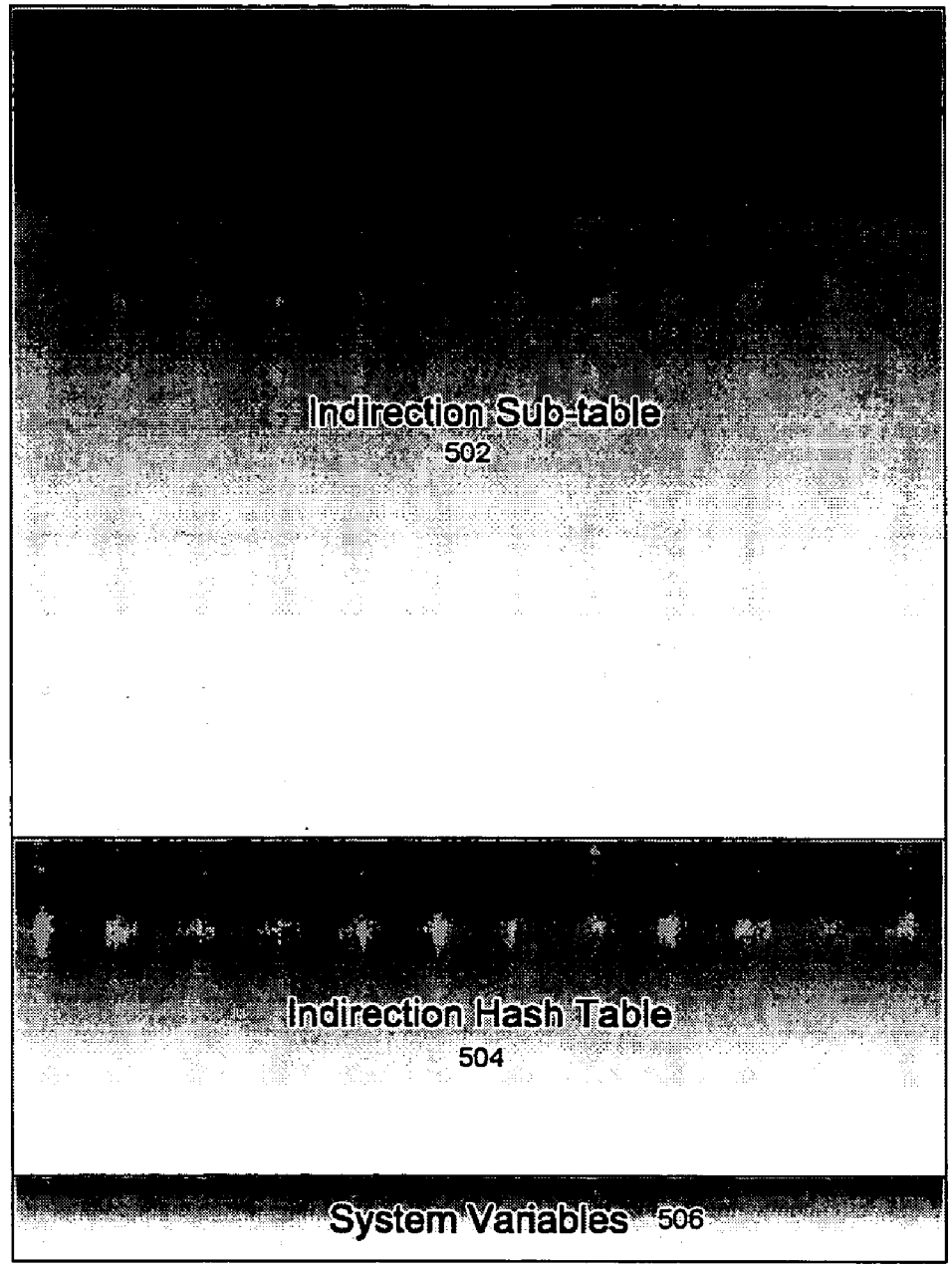
FIG. 5 is a block diagram of an exemplary master table providing logical to physical mapping structures associated with features and aspects hereof.

The logical to physical mapping implementation suggested by the exemplary structures of FIG. 4 may be implemented as table structures in a RAM memory of the disk drive controller such as exemplary master addressing table 500 of FIG. 5. Master addressing table 500 may comprise multiple sections including, for example, indirection sub-table 502, indirection hash table 504, and system variables 506. Each portion or section of the exemplary master addressing table 500 is discussed further herein below. In general, indirection sub-table 502 comprises an ordered list of pointers for translating a contiguous sequence of logical block addresses (LBAs) into a corresponding sequence of indirect block addresses (IBAs). Given the potentially large size of such a structure, indirection hash table for 504 provides a rapid index to sections of the larger interaction sub-table 502. Those of ordinary skill in the art will recognize a variety of similar structures to segment such a large table such as indirection sub-table 502 for more rapid searching. System variables 506 include numerous meta-data values and other control variables useful in managing master addressing table 500. For example, system variables 506 may include a sequence number used to identify a chronological order various copies of the master addressing table as well as the order of data frames added to the disk storage relative to a copy of the master addressing table 500. The sequence numbers in the master addressing table(s) and the data frames may be used to synchronize various pointer entries with a corresponding version of the master addressing table.

The master addressing table is preferably maintained within RAM memory of the disk controller. Since the disk controller's RAM memory is typically a volatile memory, the master addressing table 500 is periodically written to reserved areas of the disk storage medium. Such reserved areas are preferably excluded from the DBA space discussed above used for storage of host device supplied data. Storing the master addressing table 500 in such reserved locations of the disk drive storage medium assures that the logical and physical address spaces and mappings therebetween may be recovered in case of power failure in operation of the disk drive. Further, multiple copies of the master addressing table may be stored in different locations of the disk drive to further enhance reliability of the retention of the address mapping structures. Still further, each of such multiple copies may represent a different snapshot in time of the present mapping data stored on the disk drive storage medium. Such periodic snapshots of the master addressing table maintained on the disk storage medium permit rollback of the mapping structures to earlier points in time. Such a rollback feature permits managed reliability for the contents of the disk drive.

Figure 7:
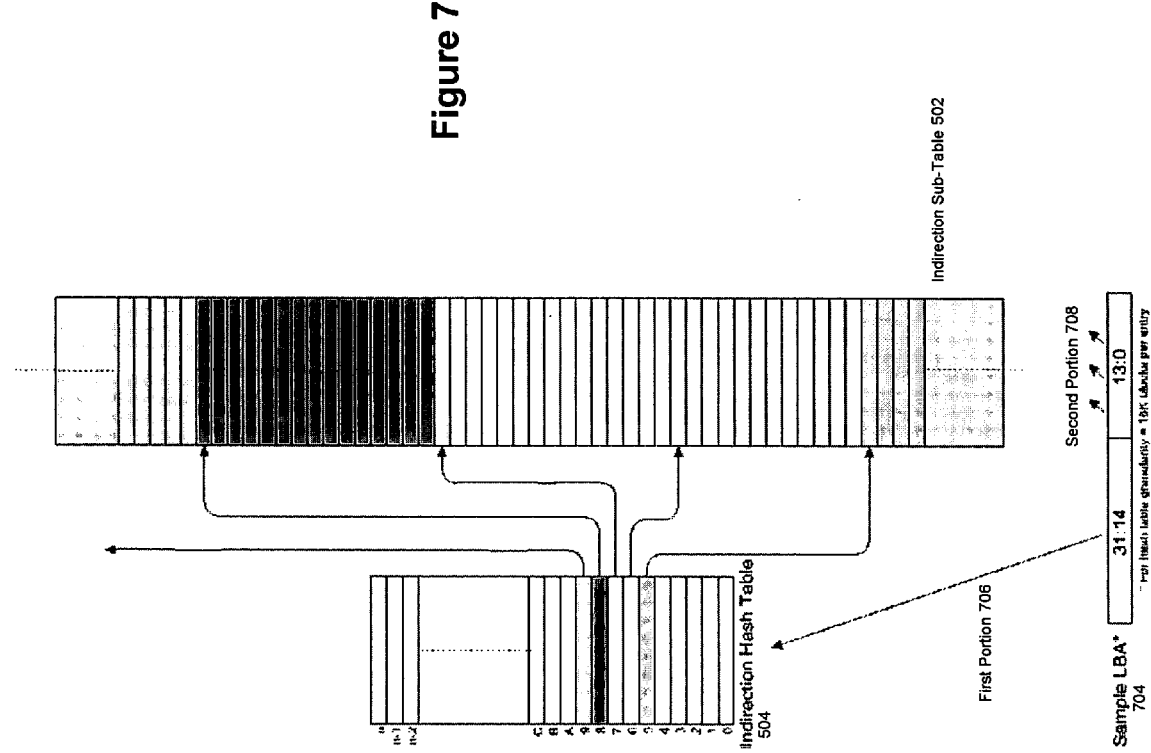
FIG. 7 is a block diagram suggesting utilization of the exemplary mapping table structures of FIG. 5 to translate or map exemplary logical block addresses into corresponding physical disk block addresses in accordance with features and aspects hereof.

The structure of entries in the various portions of the master addressing table 500 is exemplified in FIG. 6 and exemplary use of such structures is depicted in FIG. 7. Referring first to FIG. 7, the indirection hash table 504 comprises a plurality of hash table entries each pointing to the starting location of a segment of the indirection sub-table. Each segment or region of the sub-table 502 comprises a plurality of indirection sub-table entries each mapping a starting LBA to a corresponding IBA. The indirection hash table 504 therefore permits more rapid access to segments or portions of the potentially large indirection sub-table 502. As shown in FIG. 7, an upper portion 706 of an exemplary 32 bit LBA 704 may be used as an index into indirection hash table 504. The entry so located may then be used as a start pointer for the corresponding segment of the indirection sub-table 502. A lower portion 708 of bits in the exemplary LBA 704 may then be used to search the identified segment or region of the interaction sub-table 502.

FIG. 6 shows an exemplary format for each entry 600 of the hash table 504 and each entry 610 of the sub-table 502. The hash table entry 600 includes a start pointer 602 to the start of the sub-table 502 section corresponding to the hash entry's index value (i.e., the upper bit portion of an applied LBA). A sub-table page/segment size 604 indicates the number of entries in the segment to which the start pointer 602 points. Each sub-table entry 610 includes a start LBA 612 and an end LBA 614 defining the range of LBAs mapped by this entry to corresponding IBAs. The start IBA 616 indicates the first IBA of the contiguous IBAs to which the corresponding range of LBAs is mapped.

Those of ordinary skill in the art will recognize numerous equivalent structures for providing the desired indirect mapping features. The structures of FIGS. 5-7 are therefore merely intended as exemplary of one possible set of data structures for providing the desired indirect mapping and independence of logical and physical disk block sizes.

Figures 12, 13:
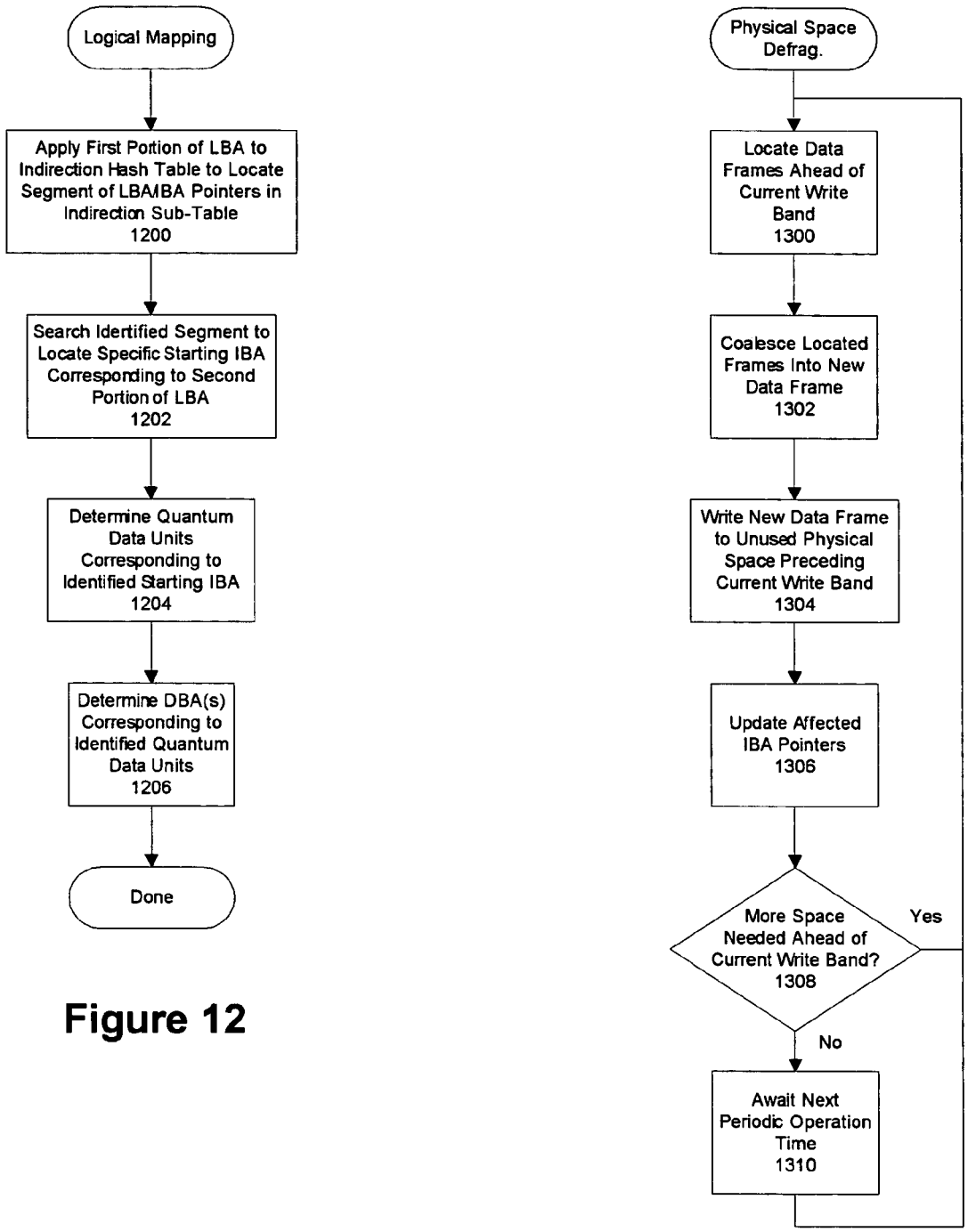
FIG. 12 is a flowchart providing further details of an exemplary method for mapping logical to physical addresses utilizing a particular exemplary mapping structure embodying features and aspects hereof.
FIG. 13 is a flowchart describing an exemplary background process for periodic defragmentation of the physical storage space in accordance with features and aspects hereof.

FIG. 12 is a flowchart describing additional details of an exemplary logical to physical mapping step utilizing the exemplary data structures described herein with respect to FIGS. 5-7. Element 1200 is first operable to apply a first portion (e.g., 706 of FIG. 7) of the received LBA to a hash table (e.g., 504 of FIGS. 5 and 7) to locate a segment or portion of the indirection sub-table (e.g., 502 of FIGS. 5 and 7). As above, the indirection sub-table entries provide mapping of a starting LBA to a corresponding starting IBA for a sequence of contiguous blocks. The hash table entry therefore points to a segment or portion of the indirection sub-table representing a contiguous segment of logical blocks. As noted above in FIG. 6, the entry may also include a size of the segment to be searched. Element 1202 then searches the identified segment to find the specific starting IBA corresponding to the second portion of the supplied LBA. Those of ordinary skill in the art will recognize that the number of bits used for the first portion as an index into the hash table and used for the second portion as a search term for searching the sub-table is a matter of design choice in trading off hash table size versus sequential searching of an identified segment. Further, those of ordinary skill in the art will recognize well-known search techniques such as binary search techniques for searching the ordered list represented by the identified segment of the sub-table.

Elements 1204 and 1208 are then operable to determine the particular quantum units of data corresponding to be identified starting IBA. Specifically, element 1204 determines the quantum address (QA) corresponding to the starting IBA and element 1208 maps the QA into a corresponding starting and ending DBA using mathematical translation techniques optionally in conjunction with a table look up associated with variable length physical block sizes. Such mathematical translations and table lookup processing techniques are well known to those of ordinary skill in the art.

Mapping Table Copies, Regeneration and Data Frames

The indirection sub-table 502 (of FIGS. 5 and 7) may grow and shrink as portions of the disk drive storage medium are utilized. The structure may be maintained as any of several well known data structures to simplify such expansion and contraction. A simple vector of entries may be used and entries shifted up or down as entries are deleted or added. Each segment of portion may be so managed as a separate vector or the various segments may be managed together such that the entire sub-table is a single vector of memory. Numerous well known dynamic memory management structures and techniques may be utilized to aid in managing the size of a working copy of the master addressing table stored in RAM memory of the disk drive controller. In particular, in one exemplary embodiment, the master addressing table and cache memory space may be commingled and managed such that the master addressing table may grow and shrink by allocating and freeing memory in cooperation with corresponding size management of cache memory. In other words, a single pool of physical memory may be used for both allocation in the master addressing table and for data caching features within the disk drive controller. Again, those of ordinary skill in the art will recognize numerous equivalent structures and techniques for dynamically managing memory used either for caching or for addressing tables associated with features and aspects hereof.

Since the RAM memory working copy of the master addressing table is typically stored in a volatile memory within the disk drive controller, it is preferable to periodically update a copy of the master table saved on the disk drive storage medium for persistent storage. In view of the large size and the latencies associated with disk media access, the master addressing table should not be updated on disk each time a change is made. Rather, the table may be copied to a reserved area of the disk periodically in response to changes made thereto. When the disk drive is powered up, the master addressing table last stored on the disk medium may be used to initialize the RAM copy of the master addressing table. However, the master addressing table most recently stored on disk will likely be inconsistent with the actual data stored on disk—i.e., will not accurately reflect data written to the disk blocks but for which the disk copy of the master tables did not get recorded prior to disk power down.

To address this condition, host supplied data is written to the disk with structured meta-data that permits the RAM copy of the mapping tables to be updated to reflect data actually recorded on the disk storage media. As discussed further herein below, data is recorded in the form of a data frame where meta-data in each data frame maintains a linked list of all data frames linked in the chronological order in which they were written to the disk. The data frame meta-data may be used to reconstruct the master addressing table by sequentially traversing a linked list of data stored on the disk drive physical storage medium. Since such traversal of data stored on the disk drive storage media can also be very time consuming at power up of the disk drive, a relatively recent version of the addressing tables is located on the disk drive medium and used as a starting point for the traversal of data frames. To reduce the time for traversing the data frames at power up initialization of the disk drive, it is preferable that the addressing tables be frequently written to the disk medium so that the addressing tables are a more accurate representation of the data frames presently stored on the disk. Conversely, in view of the potentially large size of the master addressing tables, recording the table on the persistent disk drive storage medium can be time consuming. Numerous techniques and structures will be readily apparent to those of ordinary skill in the art to establish an appropriate performance tradeoff between runtime performance during normal operation of the disk drive and power up processing time required to prepare the disk drive for normal operation. For example, the master addressing tables may be updated on the disk drive storage medium nearly constantly during idle periods in the disk drive if (i.e., when no host device request is presently pending) and may be less frequently updated during processing of host based requests.

When the disk drive is initially powered up, the working copy of the master addressing table must be retrieved into memory RAM memory of the disk drive controller and then may need to be updated to reflect any data frames written to physical disk blocks since the last posted update of the master addressing table to the persistent disk media storage. The meta-data of the master addressing table (i.e., system variable thereof) and the meta-data of the data frames may be used to reduce the time required to initialize the disk drive for normal operation.

First, where multiple copies of the master addressing table are recorded at various locations of the disk drive storage medium, the copy with the most recent (e.g., highest) sequence number will be retrieved as representing the most recently saved version of the master addressing table. The meta-data of the master addressing table preferably includes a pointer to the last data frame to be written to the disk prior to writing the corresponding copy of the master tables to the disk media. This last data frame may be used as a starting point to reduce the number of data frames that must be traversed to update the RAM copy of the initialized master addressing tables.

Figure 19:
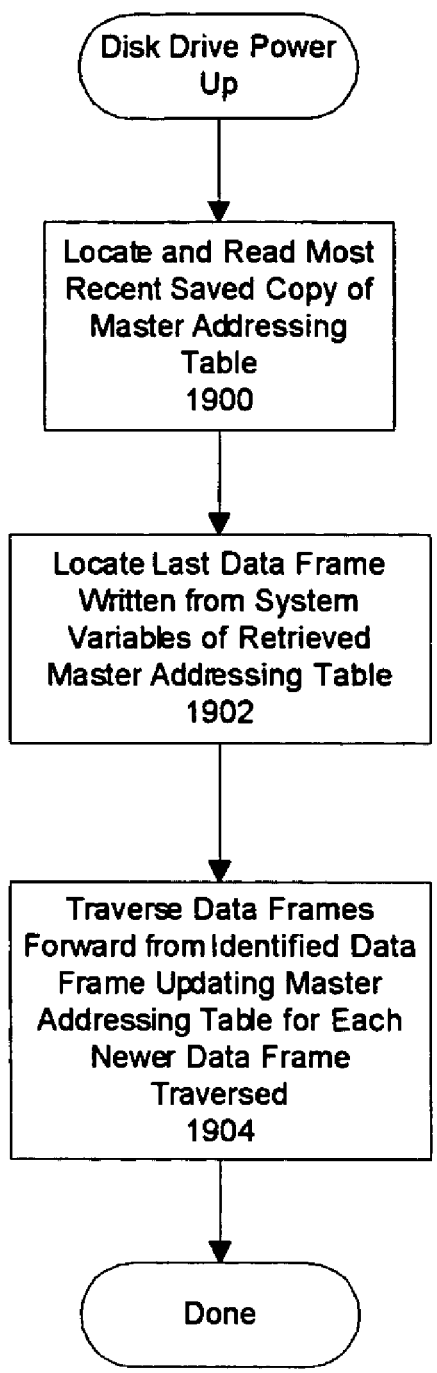
FIG. 19 is flowchart describing exemplary disk drive power up initialization in accordance with mapping features and aspects hereof.

FIG. 19 is a flowchart describing a method associated with features and aspects hereof for retrieving and updating a master addressing tables from the disk drive storage medium to perform power on of the initialization of a disk drive. Element 1900 is first operable to locate and retrieve the most recent saved copy of the master addressing table. As noted above, numerous chronological snapshots of the master addressing table may be stored on the disk drive persistent storage medium. A sequence number entry in the system variables field of each saved copy may be used to identify the most recent of the multiple copies (e.g., that having the highest sequence number). Having so retrieved the most recent copy into RAM memory of the disk drive controller, element 1902 is then operable to locate the last data frame written do disk prior to writing of this most recent master addressing table. The last data frame may be determined according to the system variables in the retrieved master addressing table. As noted above and discussed further herein below, each data frame includes meta-data including a sequence number indicating its chronological order of writing with respect to the sequence number of a corresponding master addressing table and with respect to other data frames. Data frames following the last identified data frame in the just read master addressing table are then traversed to update the just read master addressing table. Element 1904 represents processing to traverse the linked list of newer data frames starting at the identified last data frame in the retrieved master addressing table. For each data frame traversed, the master addressing table read into RAM is updated accordingly until no further data frames are encountered in the traversal. Hence, the master addressing table in RAM memory of the disk drive controller is updated during power up. Normal processing and commences with periodic saving of updates to master addressing table as noted above.

As noted above, to aid in managing mapping features and aspects hereof, a data frame structure may be utilized that includes management meta-data to permit coalescing of contiguous blocks provided by the host request and to enable the mapping features and aspects hereof. In coalescing, when a plurality of contiguous quantum units of data are to be written to the disk drive, all available contiguous quantum units with data are aggregated together to create a single data frame to be written to one or more physical disk blocks of the disk drive storage medium. The structure of the data frame enables this coalescing feature.

Figure 8:
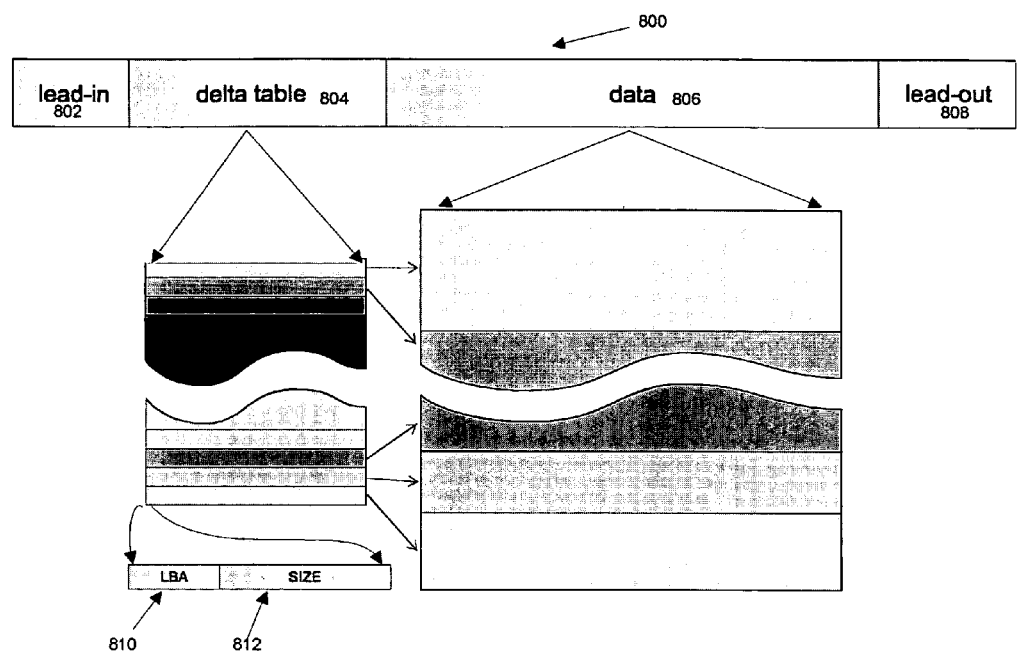
FIG. 8 is a block diagram of an exemplary data frame structure for storing physical disk blocks and exemplary, associated meta-data in accordance with features and aspects hereof.

FIG. 8 is a block diagram describing one exemplary embodiment of a data frame useful for managing mapping and other features and aspects hereof. The data frame preferably may include a lead in field 802 used to define the format and layout of portions of the data frame to follow. The lead in portion 802 is preferably a fixed size field that includes information such as the sequence number and size of the variable delta table and data portion that follows the lead in field 802. The delta table 804 may follow the lead in field and is a variable length table of entries providing a list of logical block addresses represented by the data frame. Each delta table 804 entry may include a logical block address 810 and the size 812 of the contiguous logical blocks that make up the data portion 806 that may follow. The delta table 804 entries are preferably maintained in sorted order according to starting logical block address. The delta table 804 therefore provides a map of the contiguous data portion 806 that immediately follows the delta table 804. The lead out field 808 is used as a delimiter for the frame and points to the physical location of the next data frame on the disk drive persistent storage medium—next in accordance with the chronological order in which the data frames are written. The lead out field may also be constant in size and, through its linked list field, permits traversal of all data frames in the chronological order in which they were written.

Physical Space Defragmentation

Figure 9:
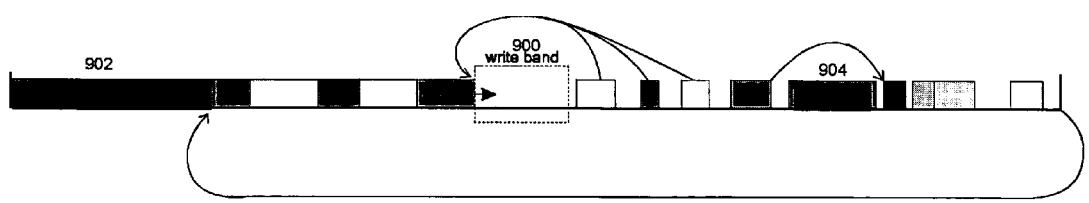
FIG. 9 is a block diagram suggesting an exemplary circular defragmentation technique associated with features and aspects hereof for defragmenting and coalescing physical disk blocks in accordance with features and aspects hereof.

Using the linked list structure of all data frames, the physical space of the disk drive storage medium may be periodically compacted. FIG. 9 is a block diagram describing a method for compacting the physical space on the disk drive storage medium. Each rectangular shaded portion of FIG. 9 represents a data frame as described above.

It is preferable to maintain a minimum write band 900 of available space on the disk drive storage medium so as to avoid the possibility of an overrun condition during disk write operations. The size of the write band 900 is a matter of design choice and may be a function of, for example, the write cache size of the disk drive controller. In order to maintain an appropriate write band, it may be necessary to periodically relocate blocks ahead of the write band—e.g., it may be necessary to defragment the physical space on the disk drive by moving blocks ahead of the write band to available space preceding or behind the write band. Such circular decompression is suggested by the movement of blocks shown in FIG. 9.

Numerous techniques and structures for such circular compression (compaction) of the physical disk space will be readily apparent to those of ordinary skill in the art. The indirect mapping and variable size data block features and aspects hereof enable such defragmentation and compaction while the indirect mapping allows relocation of physical storage space to be performed transparently with respect to host systems and devices.

FIG. 13 is a flowchart describing high level processing techniques associated with defragmentation of the physical storage space. Element 1300 is first operable to locate data frames ahead of the current write band position. Data frames may be deemed "ahead" of the current write band position if they are located in physical DBAs sequentially higher than the DBAs corresponding to the current write band position. Element 1302 then attempts to coalesce multiple located data frames into a new data frame to be written in contiguous, available physical disk blocks. Element 1304 then represents processing to write the new, coalesced data frame at physical disk block addresses representing unused physical space preceding the current write band position. If the writing of the coalesced new data frame is successful, element 1306 is operable to update the IBA pointers associated with the newly relocated data frame to reflect the new physical position of the associated indirect blocks. Element 1306 is also operable to mark the previous data frames, now coalesced into a new data frame, as free and available for reuse. In particular, the old data frames may be unlinked from the linked list queue of data frames written to the disk. Element 1308 then determines whether additional free space ahead of the current write band position is still required. If so, processing continues looping back to element 1300 to look for additional data frames ahead of the current write band position that may be relocated. If no additional space is needed at this time, element 1310 is operable to await the next periodic time for operation of the method. The method of FIG. 13 may run continuously as a background process in the disk drive controller and therefore may be scheduled at optimal times or may simply run continuously as a low priority background task. Eventually, when appropriate to continue operation, processing of the method continues looping back to element 1300 to attempt to locate additional data frames to be relocated relative to the current write band position.

Mapping Structure Defragmentation

As data is written and re-written and as data frames are relocated, the mapping table structures may also become fragmented. In particular, the exemplary indirection sub-table discussed above with respect to FIGS. 5-7 may require defragmentation and compaction. Simple block memory moves may achieve the desired compaction where simple vectors of pointers are used as described above in the exemplary embodiment of FIGS. 5-7. Where more complex linked list queues or other more complex data structures are employed, other defragmentation and compaction techniques and structures may be employed as a matter of design choice readily recognized by those of ordinary skill in the art.

Where, for example, a logically contiguous file of information is written spanning a significant period of time, the logically contiguous blocks may be physically dispersed over the physical disk block space. Further, the indirect mapping tables will have a corresponding plurality of indirection mapping entries in the table structures described above. Periodically, these mapping tables may be scanned to locate such fragmented physical blocks that correspond to contiguous logical blocks. This defragmentation procedure may then gather the dispersed blocks, read them and re-write them in a new, contiguous physical data frame so as to generate a single indirect mapping table entry. The previous plurality of mapping table entries and corresponding fragments of physical disk blocks may then be recouped for reuse and the mapping table structures may be correspondingly compressed.

Methods and structures useful for such defragmentation will be readily apparent to those skilled in the art in view of the above mapping tables formats and data frame formats discussed above.

Disk Drive Data Compression

Features and aspects hereof associated with indirect mapping and independence of the logical and physical block sizes also permit compression features to be employed within the disk drive of controller. Whereas prior techniques generally performed compression at the host driver level or operating system level, indirect mapping and independent block size features hereof permit data compression to be performed within the disk drive transparently to host systems, drivers, and applications.

Figure 14:
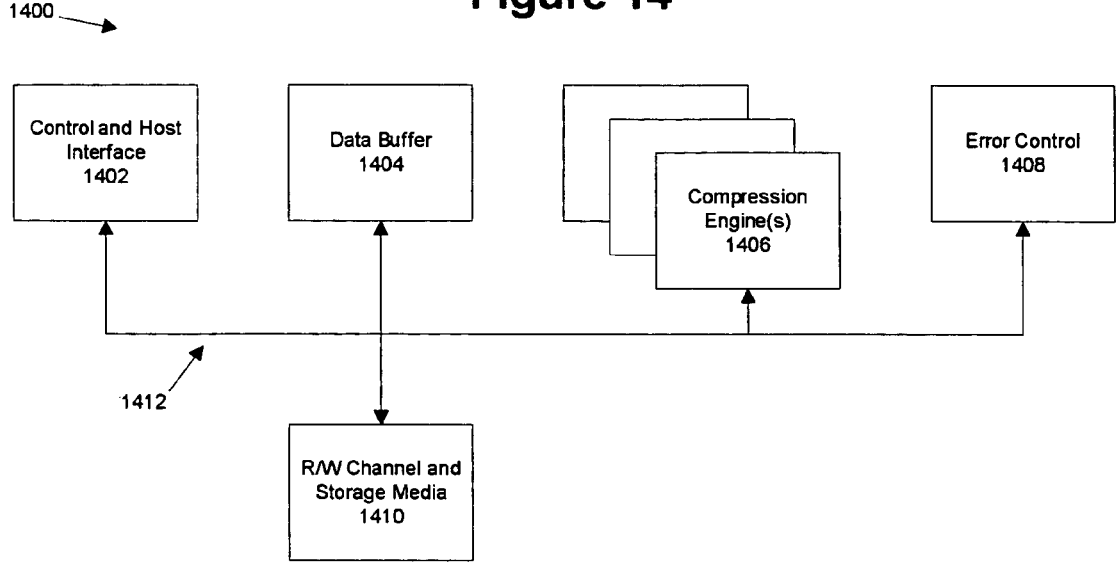
FIG. 14 is a block diagram of a disk drive controller providing indirect logical to physical mapping in accordance with features and aspects hereof to thereby enable compression of data stored on, and retrieved from, the physical disk media.

FIG. 14 is a block diagram of a disk controller 1400 in which mapping features and aspects discussed above may be embodied. Controller 1400 may include control logic and host interface 1402 for host interaction and for overall control of the disk drive. Data buffer 1404 is a memory used typically as a cache or staging buffer for exchanges of information between the disk storage media through read/write channel 1410. Compression engines 1406 represent one or more compression assistance circuits for performing on-the-fly data compression as data is moved into or out of data buffer 1404. Error control element 1408 is a circuit utilized by controller 1400 to perform error code generation and checking in association with data transfers through read/write channel 1410 to or from the storage media. All the components of controller 1400 may communicate via communication path 1412. In practice, those of ordinary skill in the art will recognize a variety of optimal communication paths and buses for dedicating particular information exchanges to particular segmented, dedicated buses and communication paths.

As noted above, logical to physical mapping features and aspects hereof along with independent logical and physical disk block size features and aspects hereof enable on-the-fly compression to be utilized within the disk controller 1400. As a matter of design choice, compression engines 1406 may compress data as it is exchanged between the data buffer 1404 and the host interface 1402 moving data between the host system and the disk controller. In such a configuration, compression engines 1406 compress received data from the host system prior to storing the data in the data buffer 1404 and decompress data from data buffer 1404 prior to returning the data to a host system. In an alternate embodiment, compression engines 1406 may compress data as it is exchanged between data buffer 1404 and read/write channel 1410. Data to be written to the disk storage media through read/write channel 1410 may be compressed as it is retrieved from data buffer 1404 for transmission to read/write channel 1410. Conversely, data read from the storage medium through read/write channel 1410 may be decompressed by decompression engines 1406 prior to storing the read data into data buffer 1404.

Depending on the particular data compression techniques utilized and the configuration for compressing data within disk controller 1400, one or more compression engines 1406 may be operable in parallel to improve performance of compression techniques within the disk controller 1400.

Those of ordinary skill in the art will recognize that the block diagram of FIG. 14 is intended merely as representative of one possible configuration of features within an improved disk controller providing on-the-fly compression and decompression. Numerous equivalent structures and additional features will be readily apparent to those of ordinary skill and the art to permit on-the-fly compression and decompression of data within the disk controller in accordance with interactive mapping features and aspects hereof and in accordance with independent logical and physical disk block size features and aspects hereof.

A variety of benefits may be derived from compression of data within a disk drive controller. One clear benefit derives from simply increasing the capacity of the disk drive storage medium. Although some overhead meta-data is required to manage the compressed data, a common compression ratio of 2:1 of the host supplied data (i.e., for typical text files) may achieve a significant benefit in improved capacity of the storage device disk drive. A second benefit associated with on-the-fly compression within a disk drive controller derives from the improved error correction capabilities to thereby enhance data reliability in a disk drive. First, by merely compressing the data before recording the data on the disk drive storage medium, existing error control codes ("ECC") provide error correction for the compressed data. Since the compressed data represents more user data in decompressed form, the same error correction capabilities normally existing in the disk drive provide improved bit error rates when measured against the volume of decompressed user data represented by the compressed data on disk. Secondly, by compressing the data portion stored on the disk drive storage medium, the recouped space may be used for generation and storage of additional error correction bits to still further improve the bit error rate for data stored on the disk storage medium.

FIGS. 15 and 16 graphically demonstrate the improved error correction features attainable by compressing data within the disk drive controller. FIG. 15 represents a typical data block or sector as presently recorded in a typical disk drive storage medium. A preamble sequence 1500 provides a header portion for information regarding the particular disk block such as block number and other meta-data information. The sync. field 1502 provides a standard bit pattern to allow the read/write channel phase lock loop controls to synchronize on the upcoming uncompressed data field 1504. As above, the data field may be one or more data frames with associated meta-data linking the frame with other frames in chronological order. Following the uncompressed data field 1504 is an error correction code field 1506 to provide error correcting bits for detecting and correcting various bit errors encountered in reading the uncompressed data 1504 from the disk storage medium. FIG. 16 represents a similar disk block or sector with compressed data in compressed data field 1602. An additional header field representing compression attributes 1600 may be added to the disk block to represent parameters of the compression algorithm applied to compress the data. In addition, as noted above, some of the recovered space due to the compression of data may optionally be used for additional error correction bits in the ECC+ field 1604.

FIGS. 17 and 18 graphically represent the benefit of improved storage capacity derived from compression of host supplied data by the disk controller. FIG. 17 depicts consecutive, contiguous physical disk blocks stored on a typical disk drive in accordance with presently known recording techniques. As above in FIG. 15, each disk block may include a preamble 1700, a sync. field 1702, uncompressed data field 1704, and a corresponding error correction code field 1706. In like manner, a next contiguous disk block may include its own preamble 1710, sync. field 1712, uncompressed data 1714, and error correcting code 1716.

In accordance with features and aspects hereof, a disk block may vary in size such that formerly contiguous independent disk blocks may be compressed into a smaller compressed data field 1802 as shown in FIG. 18. A preamble field 1700 and a sync. field 1702 may function as described above in FIG. 17. A compression attribute field 1800 may describe parameters and attributes of the compression used for compressing the user data into compressed data field 1802. ECC field 1804 then provides error correction bits for the compressed, combined data from the formerly uncompressed data are represented by uncompressed data field 1704 and uncompressed data field 1714 described above with respect to FIG. 17. Thus, a compressed frame as shown in FIG. 18 may dramatically improve the physical capacity of a disk drive despite the addition of a compression header field 1800 to the standard disk frame format.

Other Features: TPI Density, Unwind, Redundancy

Other features and aspects hereof represent other benefits derived from the flexible mapping features and aspects hereof and the independence of the logical and physical block sizes.

As noted above, the master addressing table structures (or similar mapping structures) may be saved in multiple reserved locations of the disk drive. Where the multiple copies are maintained as chronological snapshots of the mapping structures, the contents of the disk drive may be restored or "unwound" to an earlier state reflected by the saved, earlier master addressing tables. Traversing forward through the linked list of data frames since the data frame last written as saved in a restored master addressing table, the "unwinding" may be processed through to any specific write operation.

Duplicating the master addressing table as stored on the disk drive storage medium provides the unwinding feature as above as well as generally enhancing the reliability of the disk drive. Failure to read one copy of the master addressing table does not necessarily prevent use of the disk drive. Other (perhaps earlier) copies of the master addressing tables may be usable to initialize the disk drive.

In like manner, the logical to physical mapping features and aspects hereof permit the disk drive to provide redundancy of the recorded data. Since the entire physical capacity of the disk drive is mapped between host-based logical addresses and corresponding physical disk blocks, logical blocks may also be mapped to multiple physical locations. For example, each logical block could be duplicated in two (or more) corresponding physical disk blocks of the disk drive. A first copy of the data for a logical block could be on a first disk media surface (using a corresponding first R/W channel/head) and a second copy may be stored on a separate surface (using its corresponding R/W channel/head). Or, for example, a first copy of a logical block may be stored on an inner half of the cylinders of the disk drive and a second copy of the same logical block may be stored on an outer half of the cylinders of the disk drive. Still further, in addition to simple duplication of data blocks, other forms of redundancy information may be generated by the disk drive and stored on the disk drive in a manner transparent to the attached host system(s). Such redundancy may entail any form of enhanced error detection and correction including, for example, RAID-like XOR parity or other redundancy information. All such redundancy information may be generated, stored and checked by local processing features of the disk drive controller and, by virtue of the mapping features and aspects hereof, may be hidden from the attached host systems.

Another benefit enabled by mapping features and aspects hereof provides increased radial track density in storing data on the disk drive storage media surface. When writing data on a magnetic disk drive storage medium, the magnitude, shape, and direction of the magnetic field applied to the disk surface are critical factors in the quality of the recorded signal to be read. It is a well known problem in the disk drive arts that a larger magnetic field may improve the recorded signal quality but also reduces storage capacity in that larger gaps may be required between each track. The gap between tracks is needed to prevent writing of one track from unintentionally erasing (overwriting) data on an adjacent track. Though there are slight differences in the nature of the problem, this issue arises in both longitudinal recording and vertical (perpendicular) recording techniques well known in the arts.

Mapping features and aspects hereof permit logical blocks to be written in any desired physical order on the disk drive surface. In particular, features and aspects hereof suggest that data may be recorded on physical disk blocks generally in a sequential order (i.e., from inner diameter tracks/cylinders to outer diameter or vice versa). By generally advancing the read/write head in one direction (i.e., from inner diameter to outer diameter or vice versa), data that sequentially preceded this write may be saved while data on tracks/cylinders that will sequentially follow the current writing operation may be overwritten with impunity.

Figure 20:
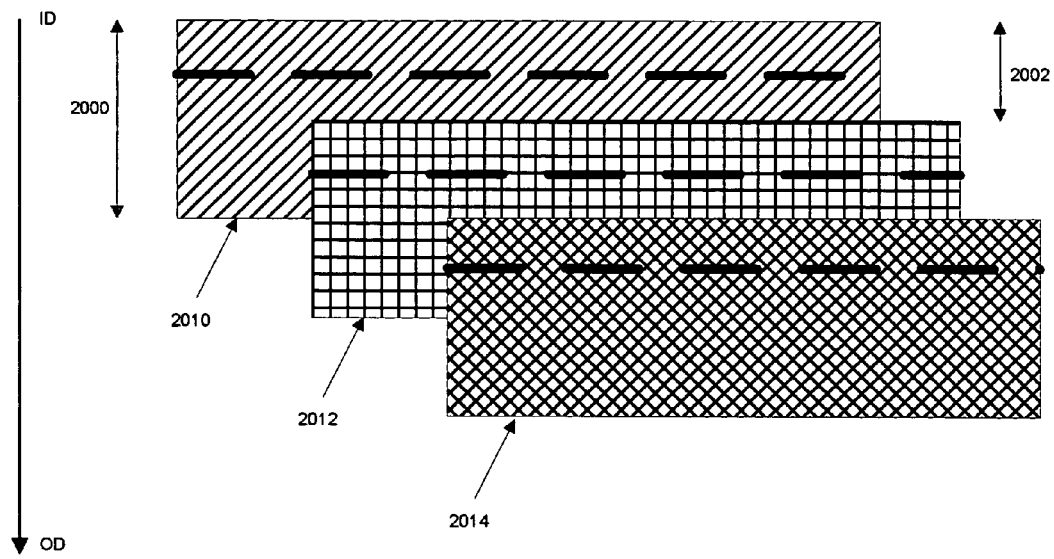
FIG. 20 is a schematic diagram of recorded, densely packed, adjacent tracks written in accordance with mapping features and aspects hereof.

FIG. 20 is a block diagram that schematically represents consecutive written tracks using such a read/write head configuration that, in conjunction with mapping features and aspects hereof, permits improved track density. Tracks 2010, 2012, and 2014 have a nominal track pitch 2002 that is less than the write head width 2000. Each track 2010, 2012, and 2014 have a track centerline indicated by a corresponding thicker dashed line. In accordance with mapping features and aspects hereof, tracks 2010, 2012, and 2014 are written in sequential order from the inner diameter of the disk surface (ID) to the out diameter (OD). Prior techniques devoid of the mapping features and aspects hereof could not assure such sequential writing of tracks except in particular, application specific circumstances (such as data logging or video data capture where an entire disk drive capacity may be filled by the capture of sequential data). By contrast, mapping features and aspects hereof assure the ability to sequentially order track writes as indicated in FIG. 20.

Assuring such a sequential order of adjacent track writes allows the tracks to be more closely spaced because unwritten tracks ahead of the current track position will not contain data that must be retained. Thus, mapping features and aspects hereof obviate the need for gaps between adjacent tracks and thereby allow a higher tack density to be recorded on the disk drive. For example, track 2010 may be written first. Later, as more logical block writes are requested by host devices, track 2012 may be written—the next/adjacent track in the direction from ID to OD. Track 2012 is written such that its inner-most edge overlaps the outermost portion of the earlier written track 2010. However, the overlap is designed such that the data of earlier track 2010 is still accurately readable. Similarly, next sequential track 2014 overlaps the outer portions of earlier track 2012, and so on.

Though features and aspects hereof permit such generally sequential writing of tracks, it may be necessary at times to re-write earlier recorded tracks. For example, mechanical shock or vibration may cause a temporary "off track" condition where the read/write head is temporarily moved off the intended track position. In such an off-track condition, continued writing may overwrite previously written data from sequentially earlier track writes. Well known servo and other control logic in disk drives reduces the amount such overwritten data but none-the-less, some overwritten data may need to be recovered. Prior techniques generally provided wide enough inter-track gaps to avoid the need for such data recovery. However, with the narrower gaps (i.e., no gaps) between tracks, some mechanism must be provided to permit possible re-writing of earlier sequential written tracks.

Mapping features and aspects hereof also provide that the most recently written blocks written in preceding, sequentially earlier tracks will remain in the disk controller's cache memory. Earlier tracks that may require re-writing may therefore be re-written from the data remaining in cache memory. However, the size of cache memory is not limitless. Further, wherever a first track is to be re-written, care must be taken to not overwrite still earlier data in still earlier adjacent tracks (track data that may no longer reside in cache memory).

Figure 21:
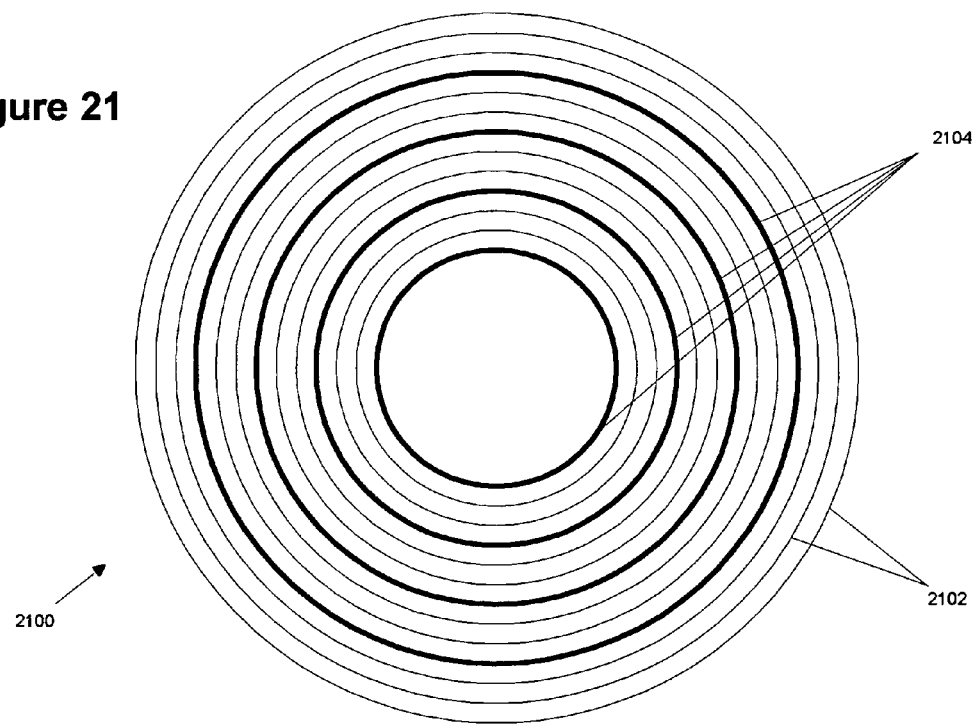
FIG. 21 is a schematic diagram of a disk recording surface have a plurality of densely packed tracks grouped between guard bands to permit recovery of earlier recorded tracks in accordance with mapping features and aspects hereof.

In accordance with features and aspects hereof, the tightly packed tracks of each disk surface may have period guard bands intermingled—i.e., periodic inter-track gaps between groupings of tracks. FIG. 21 is a schematic diagram showing a disk surface 2100 with a plurality of tracks 2102 for recording of data. Periodically interspersed between groupings of tracks are inter-track gaps 2104 (guard bands) to provide spacing between adjacent groups of tracks. The number of tracks in each such group may be determined as a matter of design choice based, in part, on the size of the write cache memory in the disk controller.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above described embodiments that fall within the scope of the invention. As a result, the invention is not limited to the specific examples and illustrations discussed above, but only by the following claims and their equivalents.

What is claimed is:

1. A storage device comprising:
a plurality of physical blocks; and
a controller
including mapping tables adapted to map requests by an attached host device for access to a logical block into access to one or more corresponding physical blocks via a quantum unit data space translation, wherein the size of the logical block and the size of the one or more corresponding physical blocks each comprise an integral multiple of a quantum unit data size.

2. The storage device of claim 1 wherein each physical block contains data received from an attached host device and compressed by the controller.

3. The storage device of claim 1 wherein the plurality of physical blocks comprises variably sized physical blocks.

4. The storage device of claim 3 wherein metadata associated with the variably sized physical blocks is used to determine the size of a physical block.

5. The storage device of claim 4 wherein the metadata is stored within the physical block.

6. A method operable in a controller of a storage device for accessing a physical block in the storage device, the method comprising:
receiving a request from a host to access a logical block within the storage device;
mapping the request using a mapping table structure to indirectly determine one or more corresponding physical blocks via a quantum unit data space translation; and accessing the one or more corresponding physical blocks on the storage device wherein the size of the logical block and the size of the physical block each comprise an integral multiple of a quantum unit data size.

7. The method of claim 6 wherein the step of accessing further comprises decompressing data in the physical block.

8. The method of claim 6 wherein the storage device comprises variably sized physical blocks.

9. The method of claim 8 wherein metadata associated with the variably sized physical blocks is used to determine a size of a physical block.

10. The method of claim 9 wherein the metadata is stored within the physical block.

11. A method operable in a storage device for storing information on the storage device, the method comprising:
- pre-allocating a write band comprising an area of contiguous physical;
- receiving a request to write user data to the storage device the size of a logical block is different than the size of the physical block of the write band and wherein the size of the logical block and the size of the physical block each comprise an integral multiple of a quantum unit data size;
- writing the user data to the pre-allocated write band; and
- updating a mapping table structure to associate the logical block with the physical block via a quantum unit data space translation.

12. The method of claim 11 further comprising:
compressing the user data prior to the step of writing.

13. The method of claim 11 wherein the storage device comprises variably sized physical blocks.

14. The method of claim 13 wherein metadata associated with the variably sized physical blocks is used to determine a size of at least one of the variably sized physical blocks.

15. The method of claim 14 wherein the metadata is stored within the at least one of the variably sized physical blocks.

16. A disk drive comprising:
- a plurality of physical disk blocks distributed over one or more recordable media and wherein each physical disk block is identified by a corresponding physical disk block address; and
- a disk controller communicatively coupled to the plurality of physical disk blocks and adapted to control access to the plurality of physical disk blocks by an attached host device, the disk controller further comprising:
- mapping tables adapted to map requests by the attached host device for access to a logical block identified by a logical block address into access to one or more corresponding physical disk blocks identified by physical disk block addresses via a quantum unit data space translation, wherein the size of the logical block and the size of the one or more corresponding physical disk blocks each comprise an integral multiple of a quantum unit data size.

17. The disk drive of claim 16 wherein each physical disk block contains data received from an attached host device and compressed by the disk controller.

18. The disk drive of claim 16 wherein the plurality of physical disk blocks comprises a plurality of variably sized physical disk blocks.

19. The disk drive of claim 18 wherein the plurality of variably sized physical disk blocks is adapted to optimize physical space between servo zones.

20. The disk drive of claim 19 wherein metadata associated with the variably sized disk blocks is used to determine a size of at least one of the variably sized physical disk blocks.

* * * * *